(12) United States Patent
Beser

(10) Patent No.: US 7,903,682 B2
(45) Date of Patent: Mar. 8, 2011

(54) VIRTUAL UPSTREAM CHANNEL SCHEDULING IN BROADBAND COMMUNICATION SYSTEMS

(75) Inventor: Nurettin Burcak Beser, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 12/353,077

(22) Filed: Jan. 13, 2009

(65) Prior Publication Data
US 2009/0180490 A1 Jul. 16, 2009

Related U.S. Application Data

(63) Continuation of application No. 10/032,622, filed on Oct. 25, 2001, now Pat. No. 7,496,110.

(60) Provisional application No. 60/314,233, filed on Aug. 21, 2001.

(51) Int. Cl.
*H04L 12/43* (2006.01)
*H04J 3/16* (2006.01)

(52) U.S. Cl. .......................... 370/458; 370/468
(58) Field of Classification Search .......... 370/458, 370/468, 503, 516
See application file for complete search history.

(56) References Cited

U.S. PATENT DOCUMENTS

| | | | |
|---|---|---|---|
| 5,960,000 A | 9/1999 | Ruszczyk et al. | |
| 5,963,557 A * | 10/1999 | Eng | 370/432 |
| 6,041,051 A | 3/2000 | Doshi et al. | |
| 6,370,153 B1 | 4/2002 | Eng | |
| 6,453,472 B1 | 9/2002 | Leano et al. | |
| 6,643,295 B1 | 11/2003 | Nose | |
| 6,742,187 B1 | 5/2004 | Vogel | |
| 6,757,253 B1 * | 6/2004 | Cooper et al. | 370/241 |
| 6,785,292 B1 * | 8/2004 | Vogel | 370/433 |
| 6,810,426 B2 | 10/2004 | Mysore et al. | |
| 6,856,786 B2 | 2/2005 | Belostotsky et al. | |
| 6,859,464 B2 | 2/2005 | Abi-Nassif et al. | |
| 6,940,874 B2 * | 9/2005 | Ruszczyk et al. | 370/516 |
| 6,961,314 B1 | 11/2005 | Quigley et al. | |
| 7,046,382 B1 * | 5/2006 | Chu | 358/1.15 |
| 7,086,082 B1 | 8/2006 | Kokkinen | |
| 7,145,887 B1 | 12/2006 | Akgun et al. | |
| 7,242,694 B2 | 7/2007 | Beser | |
| 2002/0052205 A1 | 5/2002 | Belostotsky et al. | |
| 2002/0101883 A1 | 8/2002 | Ruszczyk et al. | |
| 2002/0159513 A1 | 10/2002 | Williams et al. | |
| 2003/0193903 A1 | 10/2003 | Abi-Nassif et al. | |
| 2005/0097617 A1 | 5/2005 | Currivan et al. | |
| 2006/0013124 A1 | 1/2006 | Fottak | |

OTHER PUBLICATIONS

U.S. Appl. No. 10/032,622, filed Oct. 25, 2001, entitled "Virtual Upstream Channel Scheduling in Broadband Communication Systems", 63 pages.

\* cited by examiner

*Primary Examiner* — Hong Cho
(74) *Attorney, Agent, or Firm* — Harrity & Harrity, LLP

(57) ABSTRACT

Scheduling virtual upstream channels within one physical upstream channel is disclosed. The MAP messages of the virtual upstream channels that share the same physical upstream channel are synchronized together such that any one transmission opportunity for a given virtual upstream channel does not overlap with transmission opportunities of any other virtual channel. This includes converting all requests for transmission opportunities into a common unit and then scheduling these requests as appropriate.

20 Claims, 18 Drawing Sheets

VIRTUAL UPSTREAM CHANNEL SCHEDULING IN BROADBAND COMMUNICATION SYSTEMS

RELATED APPLICATIONS

This application claims priority from an earlier-filed provisional patent application entitled "Virtual Upstream Channels" filed on Aug. 21, 2001.

FIELD OF THE INVENTION

The present invention relates to broadband communications systems. More particularly, the present invention is directed to a upstream channel scheduling in broadband systems such as cable modem systems.

BACKGROUND

Recently, there has been an explosive demand for services, such as data, voice, and video, to be delivered over broadband communications systems. So-called cable modem technology is one of the most popular methods of providing such broadband services to subscribers. Cable modem technology competes with technologies such as Asymmetric Digital Subscriber Lines (ADSL) and ISDN (Integrated Services Digital Network). Many in the industry forecast that cable modem systems will be the prevailing technology for providing broadband services since cable television is already widely in use.

FIG. 1 illustrates a simplified diagram of a conventional cable modem system. The DOCSIS (Data Over Cable Service Interface Specifications) Radio Frequency Interface Specification specifies the transfer of IP traffic, between the cable headend system and customer locations, over an all-coaxial or a hybrid-fiber/coax (HFC) cable network 52. The transmission path over the cable system is realized at the headend by a Cable Modem Termination System (CMTS) 50, and at each customer location by a Cable Modem (CM) 56. The DOCSIS, standard defines a single transmitter for each downstream channel—the CMTS 50. All CMs 56 listen to all frames transmitted on the downstream channel upon which they are registered and accept those where the destinations match the CM 56 itself or CPEs (Customer Premises Equipment) 58 connected. CMs 56 can communicate with other CMs 56 only through the CMTS 50.

The upstream channel is characterized by many transmitters (i.e. CMs 56) and one receiver (i.e. the CMTS 50). Time in the upstream channel is slotted, providing for TDMA at regulated time ticks. The CMTS 50 provides the time reference and controls the allowed usage for each interval. Intervals may be granted for transmissions by particular CMs 56, or for contention by all CMs 56. CMs 56 may contend to request transmission time. To a limited extent, CMs 56 may also contend to transmit actual data. In both cases, collisions can occur and retries are used.

The upstream Physical Media Dependent (PMD) sublayer uses a Frequency Division Multiple Access (FDMA)/TDMA burst modulation format, which provides five symbol rates and two modulation formats (Quadrature Phase Shift Keying (QPSK) and 16-QAM (Quadrature Amplitude Modulation)). The modulation format includes pulse shaping for spectral efficiency, is carrier-frequency agile, and has selectable output power level. The PMD sublayer format includes a variable-length modulated burst with precise timing beginning at boundaries spaced at integer multiples of 6.25 sec apart (which is 16 symbols at the highest data rate). Each burst supports a flexible modulation, symbol rate, preamble, randomization of the payload, and programmable FEC (Forward Error Correction) encoding. All of the upstream transmission parameters associated with burst transmission outputs from the CM 56 are configurable by the CMTS 50 via MAC (Media Access Controller) messaging.

The upstream modulator is part of the CM 56 which interfaces with the cable network. The modulator contains the actual electrical-level modulation function and the digital signal-processing function; the latter provides the FEC, preamble prepend, symbol mapping, and other processing steps. The DOCSIS standard was developed with the idea of buffering the bursts in the signal processing portion, and with the signal processing portion (1) accepting the information stream a burst at a time, (2) processing this stream into a complete burst of symbols for the modulator, and (3) feeding the properly-timed bursted symbol stream to a memoryless modulator at the exact burst transmit time. The memoryless portion of the modulator only performs pulse shaping and quadrature upconversion.

At the Demodulator, similar to the Modulator, there are two basic functional components: the demodulation function and the signal processing function. Unlike the Modulator, the Demodulator resides in the CMTS 50 and the DOCSIS standard envision that there will be one demodulation function (not necessarily an actual physical demodulator) for each carrier frequency in use. The demodulation function would receive all bursts on a given frequency.

The demodulation function of the Demodulator accepts a varying-level signal centered around a commanded power level and performs symbol timing and carrier recovery and tracking, burst acquisition, and demodulation. Additionally, the demodulation function provides an estimate of burst timing relative to a reference edge, an estimate of received signal power, an estimate of signal-to-noise ratio, and may engage adaptive equalization to mitigate the effects of a) echoes in the cable plant, b) narrowband ingress and c) group delay. The signal-processing function of the Demodulator performs the inverse processing of the signal-processing function of the Modulator. This includes accepting the demodulated burst data stream and decoding, etc., and possibly multiplexing the data from multiple channels into a single output stream. The signal-processing function also provides the edge-timing reference and gating-enable signal to the demodulators to activate the burst acquisition for each assigned burst slot. The signal-processing function may also provide an indication of successful decoding, decoding error, or fail-to-decode for each codeword and the number of corrected Reed-Solomon symbols in each codeword. For every upstream burst, the CMTS 50 has a prior knowledge of the exact symbol rate, preamble, and burst length.

Consider the case of two cable modems (CMs) that belong to different cable segments communicating with a single Cable Modem Termination System (CMTS) illustrated in FIG. 2. In the conventional cable-modem system operation, each cable modem CM 630 and CM 620 would share a single downstream path to obtain data/signals from the CMTS 610. Also, each cable modem CM 630 and CM 620 has its own upstream path to send data/signals to the CMTS 610. Thus, two upstream frequencies and one downstream frequency is used by the system of FIG. 2. The CMTS would have a port for each CM 630 and CM 620 for the upstream traffic thereto, while having only one port for downstream traffic to both CM 630 and CM 620. Since the port to which the CMs 630 and 620 are connected is known, the CMTS knows UCID (Upstream Channel Identifier, discussed below) to assign to each cable modem. Consequently, each UCID is associated with its own upstream frequency unique to the UCID in current DOCSIS implementations. Using the UCID it is possible for CMTS 610 to schedule the CMs 620 and 630 on different upstream frequencies and then send these scheduling information on the bandwidth allocation MAP messages. The bandwidth allocation MAP messages are first parsed for the UCID by the CM such that the CM would only listen to its own MAP messages that contain the scheduling information regarding the upstream channel that it will be transmitting. If a DOCSIS downstream is associated with for example, four upstreams, than the CMTS would send 4 bandwidth allocation MAP messages that each one specifies the bandwidth allocation to each frequency that it is associated.

The UCID is also associated with an Upstream Channel Descriptor (UCD). The Upstream Channel Descriptor defines multiple DOCSIS properties, such as mini-slot size, symbol rate, frequency, and preamble pattern and burst descriptor. In sum it can be said that, the UCID defines how the CM communicates to CMTS on the Physical Media Dependent (PMD) sublayer of DOCSIS specification.

FIG. 3 describes DOCSIS bandwidth allocation and where transmit opportunities occur. The CMTS controls assignments on the upstream channel through the bandwidth allocation MAP and determines which mini-slots are subject to collisions. The CMTS allows collisions on either Requests or Data PDUs (Protocol Data Units). A "transmit opportunity" ("tx opportunity") is defined as any mini-slot in which one or more CMs may be allowed to start a transmission. The CMTS generates the time reference for identifying these slots.

For example, it may grant some number of contiguous slots to a CM for it to transmit a data PDU. The CM times its transmission so that the CMTS receives it in the time reference specified. This section describes the elements of protocol used in requesting, granting, and using upstream bandwidth. The basic mechanism for assigning bandwidth management is the bandwidth allocation MAP.

Upstream bandwidth allocation is characterized as follows. The bandwidth allocation MAP is a MAC Management message transmitted by the CMTS on the downstream channel which describes, for some interval of time, the uses to which the upstream frequency will be used by a given CM. A given MAP may describe some time slots as grants for particular stations to transmit data in, other time slots as available for contention transmission, and other slots as an opportunity for new stations to join the link.

Many different scheduling algorithms may be implemented in the CMTS by different vendors as DOCSIS does not mandate a particular algorithm. Instead, it describes the protocol elements by which bandwidth is requested and granted. Each upstream channel is characterized by an Upstream Channel Descriptor (UCD). FIG. 4 illustrates basic structure of a UCD message. A UCD is transmitted by the CMTS at periodic intervals to define the characteristics of an upstream channel. A separate message is transmitted for each upstream that contains the following information:

Configuration Change Count: Incremented by one (modulo the field size) by the CMTS whenever any of the values of this channel descriptor change. If the value of this count in a subsequent UCD remains the same, the CM can quickly decide that the remaining fields have not changed, and may be able to disregard the remainder of the message. This value is also referenced from the MAP.

Mini-slot Size: The size T of the Mini-Slot for this upstream channel in units of the Timebase Ticks of 6.25 s. Allowable values are $T=2^M$, $M=1, \ldots 7$. That is, $T=2$, 4, 8, 16, 32, 64 or 128.

UCID: The identifier of the upstream channel to which this message refers. This identifier is arbitrarily chosen by the CMTS and is only unique within the MAC-Sublayer domain.

Downstream Channel ID: The identifier of the downstream channel on which this message has been transmitted. This identifier is arbitrarily chosen by the CMTS and is only unique within the MAC-Sublayer domain.

Burst Descriptors: Burst Descriptors are composed of an upstream Interval Usage Code, followed by encoding that defines, for each type of upstream usage interval, the physical-layer characteristics that are to be used during that interval. A burst profile consists of a set of specific PHY (physical layer) parameters-modulation, preamble length, Reed-Solomon block size, Reed-Solomon error correction capability, scrambler seed, differential encoding on/off, shortened-last codeword mode on/off, maximum burst size, and guard time size. Burst profiles are assigned on an upstream channel basis in a downstream MAC Management Message called the Upstream Channel Descriptor (UCD). The idea was that multiple burst profiles could be defined and that a cable modem (CM) would have these sets of parameters stored in the PHY transmitter, and the CM could make use of different burst profiles.

FIG. 5 illustrates The contents of overall channel information and burst descriptors which are Type Length Value (TLV) encoded. The first three TLVs that a UCD message contains symbol rate, frequency, and preamble superstring which applies to overall upstream channel. It also contains a plurality of burst descriptors which describes the characteristics of the upstream transmission depending on the Interval Usage Code (Table 1) of the transmission as scheduled by the CMTS with MAP messages.

FIG. 6 illustrates an upstream bandwidth allocation MAP message. The upstream bandwidth allocation MAP is a varying-length MAC Management message that is transmitted by the CMTS to define transmission opportunities on the upstream channel. It includes a fixed-length header followed by a variable number of information elements (IEs) message which contains the information regarding:

Upstream Channel ID: The identifier of the upstream channel to which this message refers.

UCD Count: Matches the value of the Configuration Change Count of the UCD which describes the burst parameters which apply to this map.

Number of Elements: Number of information elements in the map.

Alloc Start Time: Effective start time from CMTS initialization (in mini-slots) for assignments within this map.

Ack Time: Latest time, from CMTS initialization, (mini-slots) processed in upstream. This time is used by the CMs for collision detection purposes.

Ranging Backoff Start: Initial back-off window for initial ranging contention, expressed as a power of two. Values range 0-15 (the highest order bits must be unused and set to 0).

Ranging Backoff End: Final back-off window for initial ranging contention, expressed as a power of two. Values range 0.0-15 (the highest order bits must be unused and set to 0).

The allocation MAP is a varying length MAC Management message that is transmitted by the CMTS to define transmission opportunities on the upstream channel. It includes a fixed-length header followed by a variable number of Information Elements (IEs) in the message being transmitted by the CMTS. The number of Transmit Opportunities associated with a particular Information Element (IE) in a MAP is dependent on the total size of the region as well as the allowable size of an individual transmission.

FIG. 7 illustrates the format of Information Elements. Each IE consists of a 14-bit Service ID, a 4-bit type code, and a 14-bit starting offset. Since all stations will scan all IEs, it is critical that IEs be short and relatively fixed format. IEs within the MAP are strictly ordered by starting offset. For most purposes, the duration described by the IE is inferred by the difference between the IEs starting offset and that of the following IE. For this reason, a Null IE terminates the list.

Table 1 below lists IEs and their corresponding Interval Usage Codes (IUCs).

TABLE 1

Information Elements and IUCs

| Interval Usage Code | Information Element Name |
| --- | --- |
| 1 | Request |
| 2 | REQ/Data |
| 3 | Initial Maintenance |
| 4 | Station Maintenance |
| 5 | Short Data Grant |
| 6 | Long Data Grant |
| 7 | Null IE |
| 8 | Data Acknowledge |
| 9-14 | Reserved |
| 15 | Expanded IUC |

As an example, assume a REQ (Request) IE defines a region of 12 mini-slots. If the UCD defines a REQ Burst Size that fits into a single mini-slot then there are 12 Transmit Opportunities associated with this REQ IE, i.e., one for each mini-slot. If the UCD defines a REQ that fits in two mini-slots, then there are six Transmit Opportunities and a REQ can start on every other mini-slot.

As another example, assume a REQ/Data IE that defines a 24 mini-slot region. If it is sent with an SID of 0x3FF4, then a CM can potentially start a transmit on every fourth mini-slot; so this IE contains a total of six Transmit Opportunities (TX OPs). Similarly, a SID of 0x3FF6 implies four TX OPs; 0x3FF8 implies three TX OPs; and 0x3FFC implies two TX OPs.

For an Initial Maintenance IE, a CM starts its transmission in the first mini-slot of the region; therefore it has a single Transmit Opportunity. The remainder of the region is used to compensate for the round trip delays since the CM has not yet been ranged. Station Maintenance IEs, Short/Long Data Grant IEs and unicast Request IEs are unicast and thus are not typically associated with contention Transmit Opportunities. They represent a single dedicated, or reservation based, Transmit Opportunity.

FIG. 8 illustrates the format of a DOCSIS MAC frame. A frame is a unit of data exchanged between two (or more) entities at the Data Link Layer. A MAC frame consists of a MAC Header and may incorporate a variable-length data PDU. The variable-length PDU includes a pair of 48-bit addresses, data, and a CRC (Cyclic Redundancy Check). In special cases, the MAC Header may encapsulate multiple MAC frames into a single MAC frame. A MAC frame is the basic unit of transfer between MAC sublayers at the CMTS and the cable modem. The same basic structure is used in both the upstream and downstream directions. MAC frames are variable in length. The term "frame" is used in this context to indicate a unit of information that is passed between MAC sublayer peers. Preceding the MAC frame is either PMD sublayer overhead (upstream) or an MPEG (Motion Picture Experts Group) transmission convergence header (downstream). The first part of the MAC frame is the MAC Header. The MAC Header uniquely identifies the contents of the MAC frame.

FIG. 9 illustrates the interchange between the CM and the CMTS when the CM has data to transmit Suppose a given CM has a data PDU available for transmission.

1. At time $t_1$, the CMTS transmits a MAP whose effective starting time is $t_3$. Within this MAP is a Request IE which will start at $t_5$. The difference between $t_1$ and $t_3$ is needed to allow for:

Downstream propagation delay (including FEC interleaving) to allow all CMs to receive the Map Processing time at the CM (allows the CMs to parse the Map and translate it into transmission opportunities)

Upstream propagation delay (to allow the CMs transmission of the first upstream data to begin in time to arrive at the CMTS at time $t_3$);

2. At $t_2$, the CM receives this MAP and scans it for request opportunities. In order to minimize request collisions, it calculates $t_6$ as a random offset based on the Data Backoff Start value in the most recent MAP;

3. At $t_4$, the CM transmits a request for as many mini-slots as needed to accommodate the PDU. Time $t_4$ is chosen based on the ranging offset so that the request will arrive at the CMTS at $t_6$.

4. At $t_6$, the CMTS receives the request and schedules it for service in the next MAP. (The choice of which requests to grant will vary with the class of service requested, any competing requests, and the algorithm used by the CMTS.)

5. At $t_7$, the CMTS transmits a MAP whose effective starting time is $t_9$. Within this MAP, a data grant for the CM will start at $t_{13}$.

6. At $t_8$, the CM receives the MAP and scans for its data grant.

7. At $t_{10}$, the CM transmits its data PDU so that it will arrive at the CMTS at $t_{11}$. Time $t_{10}$ is calculated from the ranging offset as in step 3.

Steps 1 and 2 need not contribute to access latency if CMs routinely maintain a list of request opportunities. At Step 3, the request may collide with requests from other CMs and be lost. The CMTS does not directly detect the collision. The CM determines that a collision (or other reception failure) occurred when the next MAP fails to include acknowledgment of the request. The CM will then perform a back-off algorithm and retry.

At Step 4, the CMTS scheduler fail to accommodate the request within the next MAP. If so, it will reply with a zero-length grant in that MAP or discard the request by giving no grant at all. It will continue to report this zero-length grant in all succeeding maps until the request can be granted or is discarded, This will signal to the CM that the request is still pending. So long as the CM is receiving a zero-length grant, it will not issue new requests for that service queue.

DOCSIS allows various combinations of upstream and downstream channels within one MAC service access point. The upstream bandwidth allocation protocol allows for multiple upstream channels to be managed via one or many downstream channels. If multiple upstream channels are associated with a single downstream channel, then the CMTS sends one bandwidth allocation MAP per upstream channel. The bandwidth allocation MAP's channel identifier, taken with the Upstream Channel Descriptor Message, specifies to which channel each bandwidth allocation MAP applies. There is no requirement that the maps be synchronized across channels.

When a DOCSIS certified CM reboots it first scans for a downstream channel (it first looks into the stored last operational parameters). A downstream channel is considered valid when:
- synchronization of the QAM symbol timing
- synchronization of the FEC framing
- synchronization of the MPEG packetization
- recognition of SYNC downstream MAC messages is achieved.

After synchronization, the CM will wait for an upstream channel descriptor message (UCD) from the CMTS in order to retrieve a set of transmission parameters for a possible upstream channel. These messages are transmitted periodically from the CMTS for all available upstream channels and are addressed to the MAC broadcast address. The CM will determine whether it can use the upstream channel from the channel description parameters.

The CM would then pick one of the upstream channel IDs in its table and wait for the initial ranging period for this upstream channel ID in the bandwidth allocation MAP signal, and try to range in the timeframe allocated. If initial ranging is not successful, then the next upstream channel ID is selected, and the procedure restarted from UCD extraction. When there are no more channel IDs to try, then the CM will continue scanning to find another downstream channel.

The ranging request message does not include an Upstream Channel ID since it is inherently assumed in DOCSIS that the frequency defines the Upstream Channel ID. Due to this reason the DOCSIS specification mandates that the CM have to use whatever Upstream Channel ID is returned by the CMTS in the Ranging Response message. In other words even though the CM may choose any Upstream Channel ID to transmit the initial ranging request the CMTS has the ultimate power to make the CM to use a certain Upstream Channel ID.

From this point on the CM is to use the given Upstream Channel ID, when it is parsing for the transmission opportunities the CM has to first find the one with matching Upstream Channel ID. And then parse the bandwidth allocation MAP to find the SIDs that it is using. After the registration it is possible that the CM would receive a Upstream Channel Change Request message stating that it has to switch to a different Upstream Channel ID. The CM in response will be sending two Upstream Channel Change Response messages in the same frequency one that states the reception of the Upstream Channel Change request. Afterwards the CM is to parse for Upstream Channel ID bandwidth allocation MAP message for transmission opportunities send to broadcast SIDs or SIDs that belong to the CM.

If multiple downstream channels are associated with a single upstream channel, the CMTS must ensure that the bandwidth allocation MAP reaches all CMs. That is, if some CMs are attached to a particular downstream channel, then the bandwidth allocation MAP will be transmitted on that channel. This may necessitate that multiple copies of the same bandwidth allocation MAP be transmitted. The Alloc Start Time in the bandwidth allocation MAP header will always relate to the SYNC reference on the downstream channel on which it is transmitted.

If multiple downstream channels are associated with multiple upstream channels, the CMTS may need to transmit multiple copies of multiple maps to ensure both that all upstream channels are mapped and that all CMs have received their needed maps.

After synchronization, the CM will wait for an upstream channel descriptor message (UCD) from the CMTS in order to retrieve a set of transmission parameters for a possible upstream channel. The UCD messages are transmitted periodically from the CMTS for all available upstream channels and are addressed to the MAC broadcast address. The CM will determine whether it can use the upstream channel from the channel description parameters.

The CM will collect all UCDs, which are different in their upstream channel ID field to build a set of usable channel IDs. If no channel can be found after a suitable timeout period, then the CM will continue scanning to find another downstream channel. The CM determines whether it can use the upstream channel from the channel description parameters. If the channel is not suitable, then the CM will try the next upstream channel ID until it finds a usable channel. If the channel is suitable, the CM will extract the parameters for this upstream from the UCD. It then will wait for the next SYNC message and extract the upstream mini-slot timestamp from this message. The CM then will wait for a bandwidth allocation MAP for the selected channel. It may begin transmitting upstream in accordance with the MAC operation and the bandwidth allocation mechanism.

The CM will perform initial ranging at least once. If initial ranging is not successful, then the next upstream channel ID is selected, and the procedure restarted from UCD extraction. When there are no more channel IDs to try, then the CM will continue scanning to find another downstream channel. At any time after registration, the CMTS may direct the CM to change its upstream channel. This can be done for traffic balancing, noise avoidance, or any of a number of other reasons.

FIG. 10 illustrates an example of a single downstream channel and four upstream channels. In FIG. 10, the four upstream channels are on separate fibers serving four geographical communities of modems. The CMTS has access to the one downstream and all four upstreams, while each CM has access to the one downstream and only one upstream.

In this topology, the CMTS transmits Upstream Channel Descriptors (UCDs) and MAPs for each of the four upstream channels related to the shared downstream channel. Unfortunately, each CM cannot determine which fiber branch it is attached to because there is no way to convey the geographical information on the shared downstream channel. At initialization, the CM randomly picks a UCD and its corresponding MAP. The CM then chooses an Initial Maintenance opportunity on that channel and transmits a Ranging Request.

The CMTS will receive the Ranging Request and will redirect the CM to the appropriate upstream channel identifier by specifying the upstream channel ID in the Ranging Response. The CM will then use the upstream channel ID of the Ranging Response, not the channel ID on which the Ranging Request was initiated. This is necessary only on the first Ranging Response received by the CM. The CM will continue the ranging process normally and proceed to wait for station maintenance IEs. From then on, the CM will be using the bandwidth allocation MAP that is appropriate to the fiber branch to which it is connected. If the CM ever has to redo initial maintenance, it may start with its previous known UCD instead of choosing one at random.

Below are the MAC messages that contain Channel Ids:
Upstream Channel Descriptor
Bandwidth Allocation MAP
Ranging Response
Dynamic Channel Change request
With unsynchronized timestamps:
Since upstream synchronization relies on downstream timestamps, each upstream channel must be associated with the time stamp of one of the downstream channels.

The downstream channels should only transmit MAP messages and UCD messages that pertain to their associated upstream channels.

To highlight the key points of conventional architectures, current DOCSIS implementations use one frequency per DOCSIS Upstream Channel:

Only two upstream burst profiles are available for data that is granted;

There are rules defining which of the two burst profiles is used based solely upon MAC PDU length; and All CMs on the same upstream channel use the same minislot size, symbol rate, and burst profiles.

FIG. 11 illustrates a DOCSIS System with cable modems of different noise levels. For example, suppose on an upstream channel, some CMs can achieve adequate upstream Bit Error Rate (BER) performance using 16-QAM and a relatively low error-correcting Reed-Solomon code while others require QPSK and more Reed-Solomon error correction as depicted in FIG. 11. The modems depicted on the upper portion have better performance (such that a less robust more efficient burst profile can be used) on their portion of the cable segment such that they can sustain a 16-QAM modulation whereas the CMs on the lower portion has a worse performing cable segment (needs more robust hence less efficient burst profile) such that they can only sustain acceptable PER with QPSK modulation.

If these CMs are to run on the present DOCSIS systems, and it is desired to provide all CMs with adequate BER performance, the upstream channel descriptor parameters will have to accommodate the CMs experiencing the less robust transmission, in other words the DOCSIS upstream channel has to be used as if all the CMs are in the same noise/performance characteristics of the worst connection as shown in FIG. 12. In FIG. 12 all CMs are forced to QPSK modulation.

However, this is a sacrifice to the CMs, which can successfully use 16-QAM and less Reed-Solomon parity, and it is a sacrifice to the system as a whole because the capacity of the upstream channel could be much better utilized by some CMs as opposed to others.

Segregating modems into two distinct upstream frequencies has a number of objections. In some cases, from a node, there will only be one upstream frequency available, all the other frequencies will be used for other purposes such as Video on demand, non-DOCSIS voice transport. Also, the number of CMs in the high and low error rate categories may not correspond well with the available capacity of the different channels provided to them. For example it is possible that only a cope of modems are in the high noise region that requires QPSK modulation.

One solution is to segregate CMs experiencing higher error rates on particular frequencies that run at more robust transmission modes. Assume that as depicted in FIG. 13 there are two DOCSIS upstream frequencies (RF Frequency #1 and RF Frequency #2 with upstream channel descriptors set as such that the CMs with lower noise will run 16-QAM and higher will run in QPSK mode with proper settings. Another consideration is that high utilization on a particular channel associated with a particular level of BER performance may prevent another CM from being assigned to it, and thus, the CM is put on another channel where it really does not belong. It would be much more efficient from a system standpoint to have the ability to handle both on the same channel.

It would seem impairments impact all CMs on an upstream plant or upstream channel, and thus, allowing some CMs to use 16-QAM and less Reed-Solomon parity and others QPSK and that more Reed-Solomon parity is not necessary. For Additive White Gaussian Noise, impulse noise, or narrowband ingress, the noise "funneling" effect of the upstream HFC plant (by nature of the topology) results in impact on all users on that upstream channel. So, knowledge of the level of these impairments on an upstream channel helps to determine the baseline burst profile parameters to be set to make the upstream transmission robust. This can be done in an automated fashion by a CMTS with advanced channel monitoring capabilities.

However, there are other impairments that do not impact all CM signals received in the upstream, but may only impact a particular CM or CMs on a segment of the plant. For example, impairments and distortion can be due to a tap or amplifier that is malfunctioning or has degraded. Or for example, a particular CM may have a degraded component or suffer a non-fatal fault that impacts its transmission performance. In these cases, it would be possible for the CMTS, through its channel monitoring functions, to ascertain which CM or CMs are impacted, and it would be beneficial that these modems could be assigned upstream channels that could better overcome their localized impairments.

Recently, one innovation in channel architecture has been the introduction of 'virtual upstream channels' which are used to segregate a single physical upstream channel. Each virtual upstream channel can group together a set of cable modems. New virtual upstream channels may be added and existing virtual upstream channels may be removed as desired. However, a challenging aspect of using virtual upstream channels are problems with scheduling these channels to use the physical upstream channel with minimal contention. Thus, there is a need a scheduling system that the CMTS can employ so that virtual upstream channels are not scheduled simultaneously.

SUMMARY OF THE INVENTION

A method and apparatus for scheduling virtual upstream channels within one physical upstream channel is disclosed. In one embodiment, the MAP messages of the virtual upstream channels that share the same physical upstream channel are synchronized together such that any one transmission opportunity for a given virtual upstream channel does not overlap with transmission opportunities of any other virtual channel. This may be achieved by converting all requests for transmission opportunities into a common unit and then scheduling these requests as appropriate.

DETAILED DESCRIPTION OF THE INVENTION

In brief, the invention, in various embodiments, consists of a method and apparatus for the design and implementation of a CMTS scheduling system to work with virtual upstream channels. In general, the CMTS scheduling system recognizes what virtual upstream channels share the same physical upstream channel and schedule these such that they do not use the same transmission area at the same time. For each virtual upstream channel that is desired, a separate bandwidth allocation MAP message is sent by the CMTS on the same physical upstream channel. These MAP messages can be synchronized such that transmission areas do not overlap. One means of achieving synchronization of MAP messages is to convert requests (which may be different in size/timing) for bandwidth allocation into a common unit and then perform the scheduling in response to the requests. The scheduling system can be implemented using a variety of Information Elements (IEs) schemes for the MAP messages, including the use of null and placeholder Service Identifiers (SIDs). The scheduling system can also allocate bandwidth based upon a wide variety of quality of service and other constraints. In one embodiment, the scheduling system provides its best efforts to optimize the utilization of the physical upstream channel by the CMs. In other embodiments, the scheduling system provides best efforts latency differentiation among CMs. Latency differentiation will allow slower CMs to transmit user data proportionately more frequently than faster CMs in order to provide reduced perceived latency for users of the slower CMs.

Virtual Upstream Channel MAP Message Construction

Figure 1:
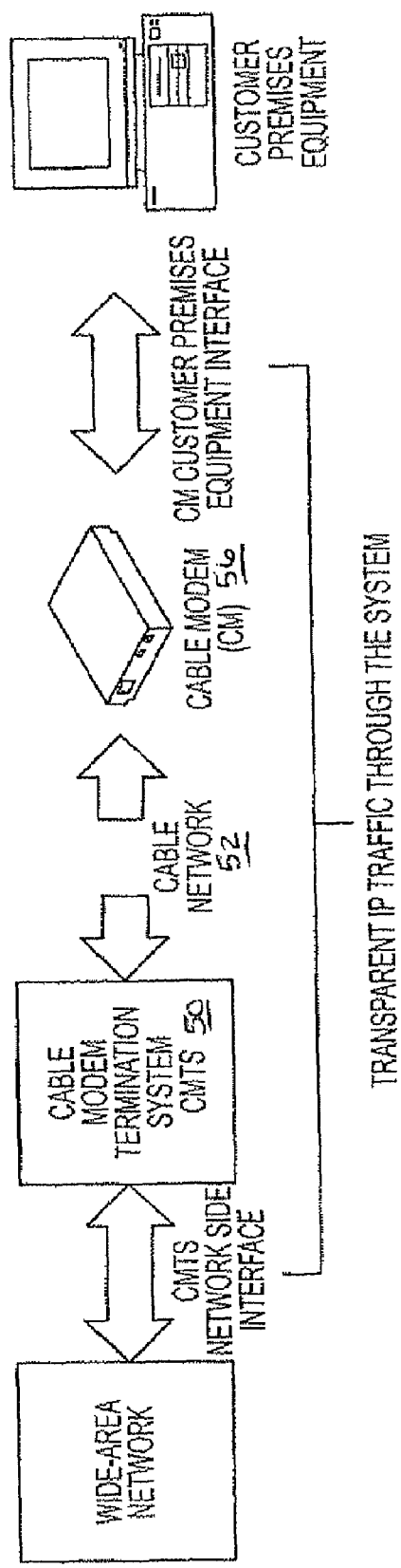
FIG. 1 illustrates a simplified diagram of a conventional cable modem system.
Figure 2:
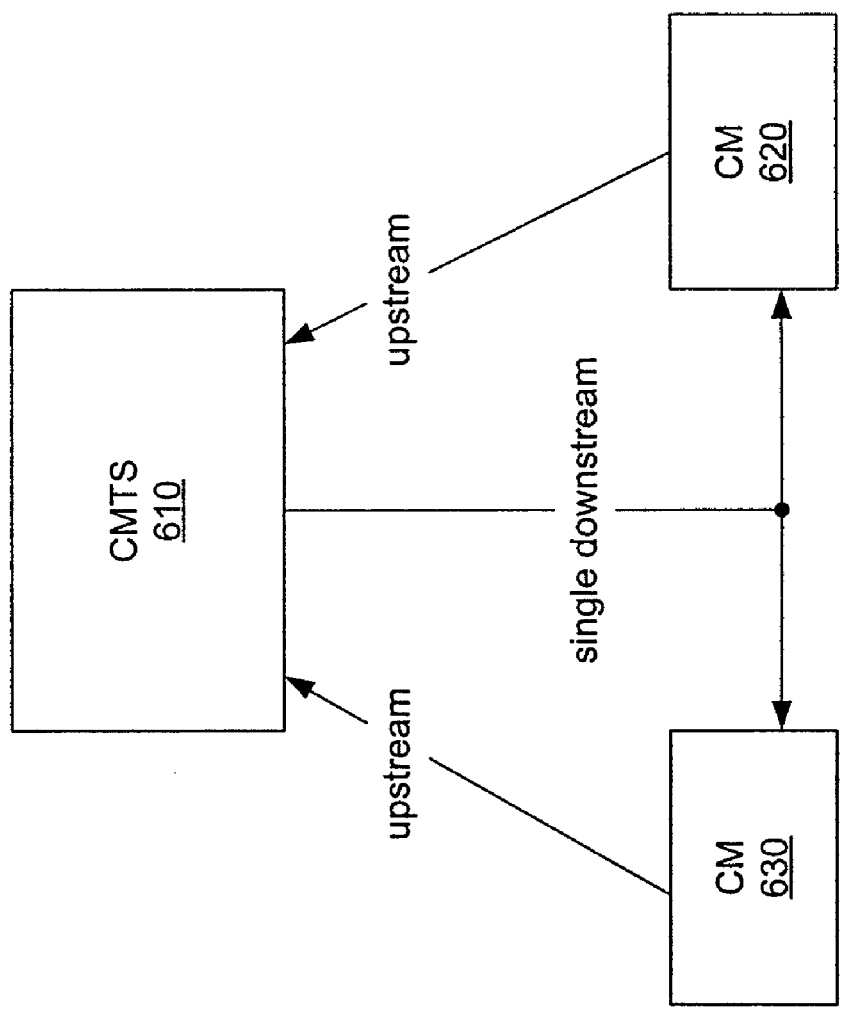
FIG. 2 illustrates the case of two cable modems (CMs) communicating with a single Cable Mode Termination System (CMTS)
Figure 3:
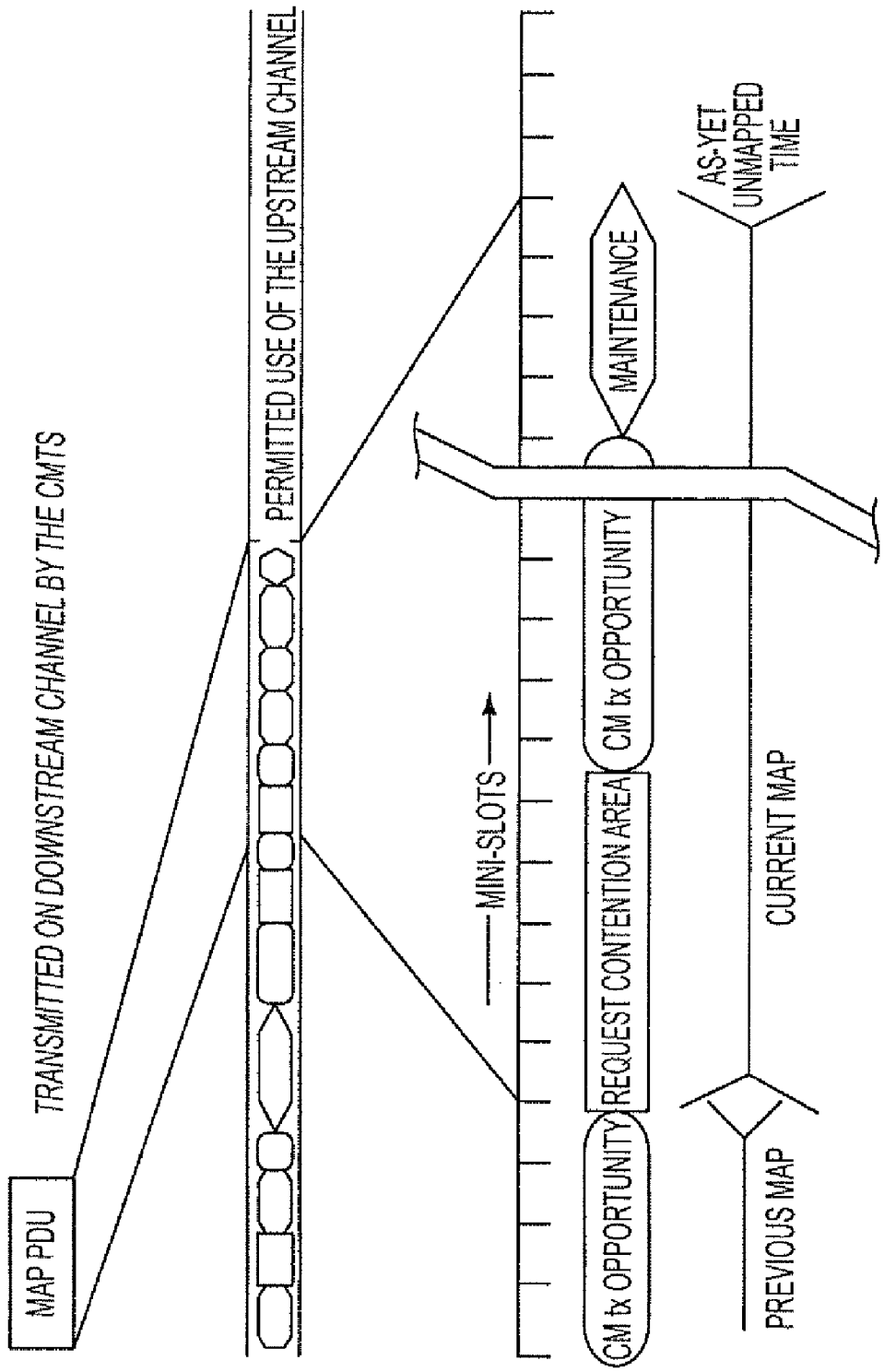
FIG. 3 describes DOCSIS bandwidth allocation and where transmit opportunities occur.
Figure 4:
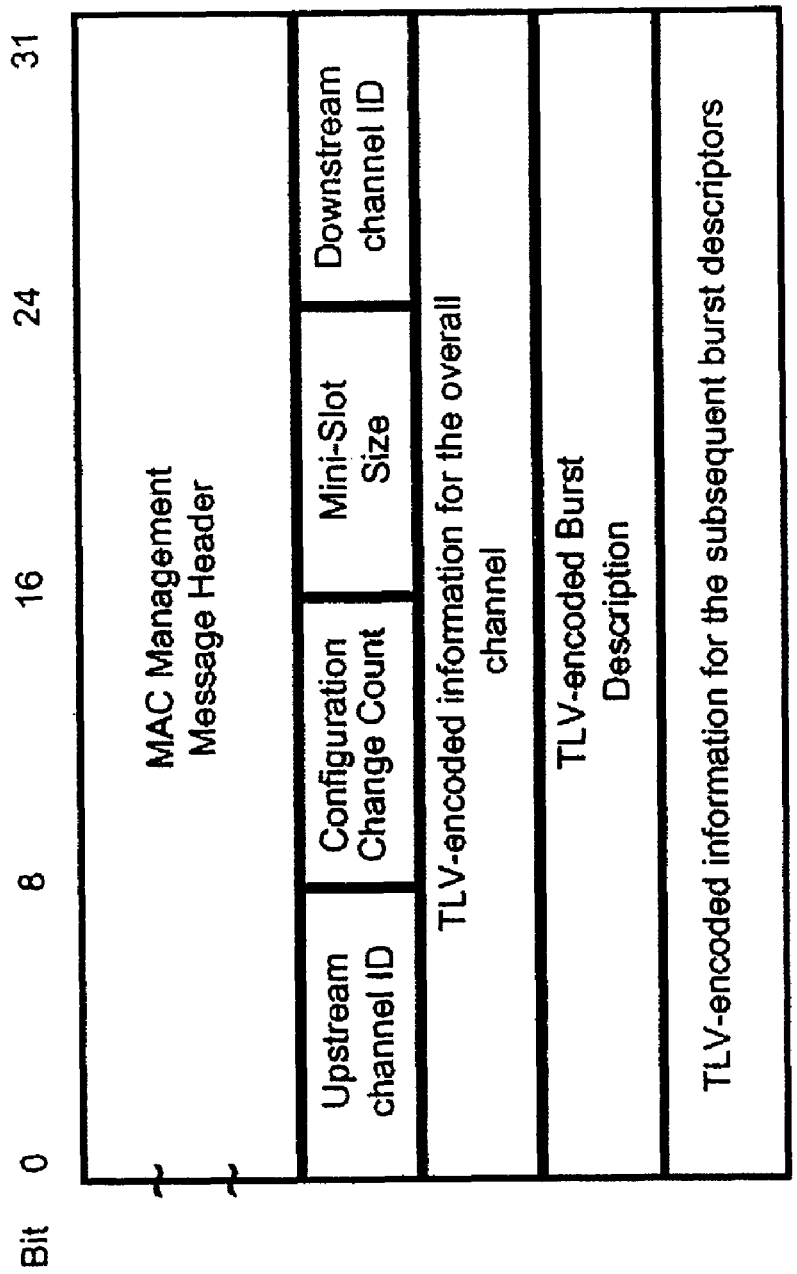
FIG. 4 illustrates an exemplary UCD.
Figure 5:
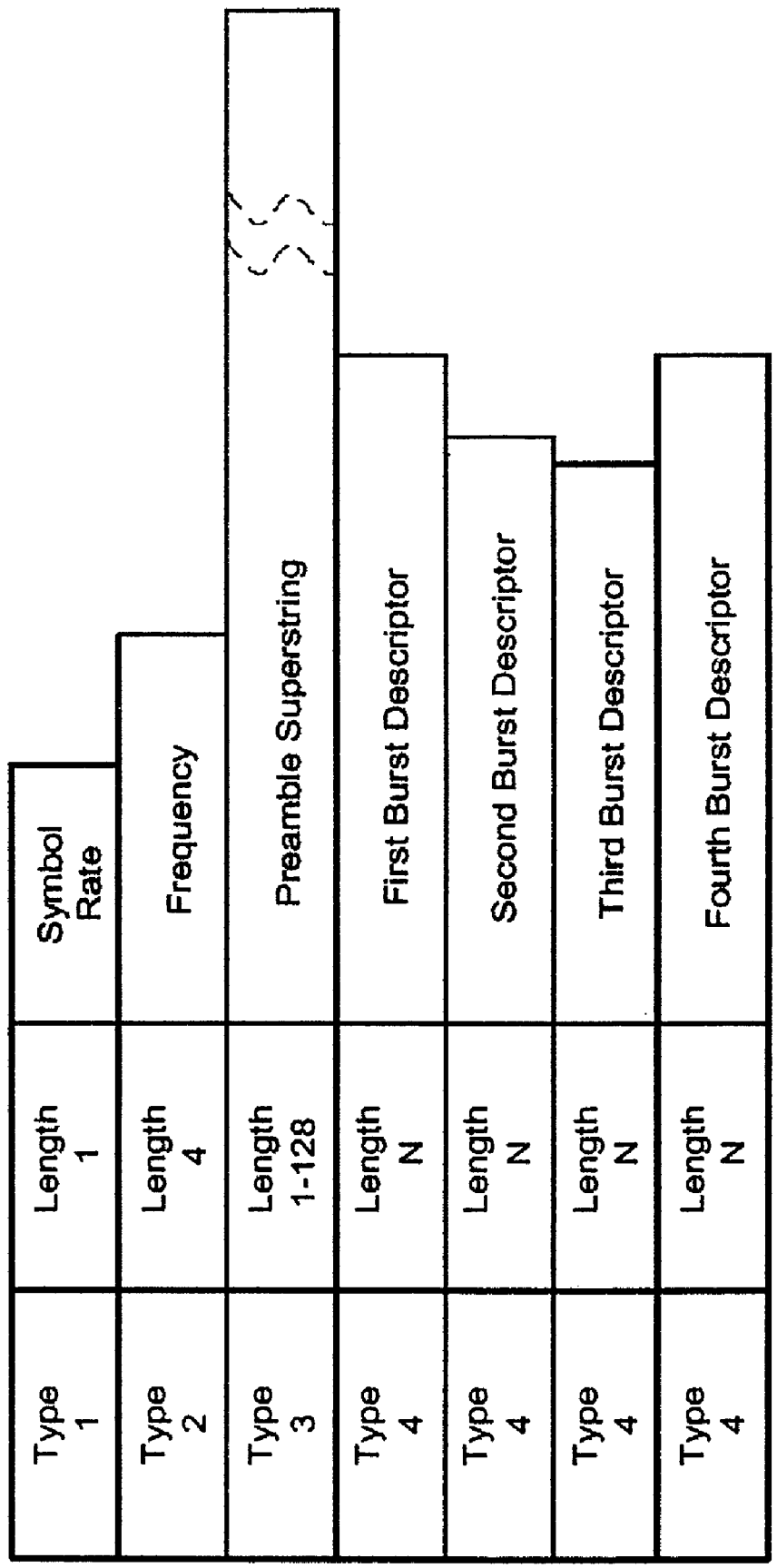
FIG. 5 illustrates an Upstream Channel Descriptor Message.
Figure 6:
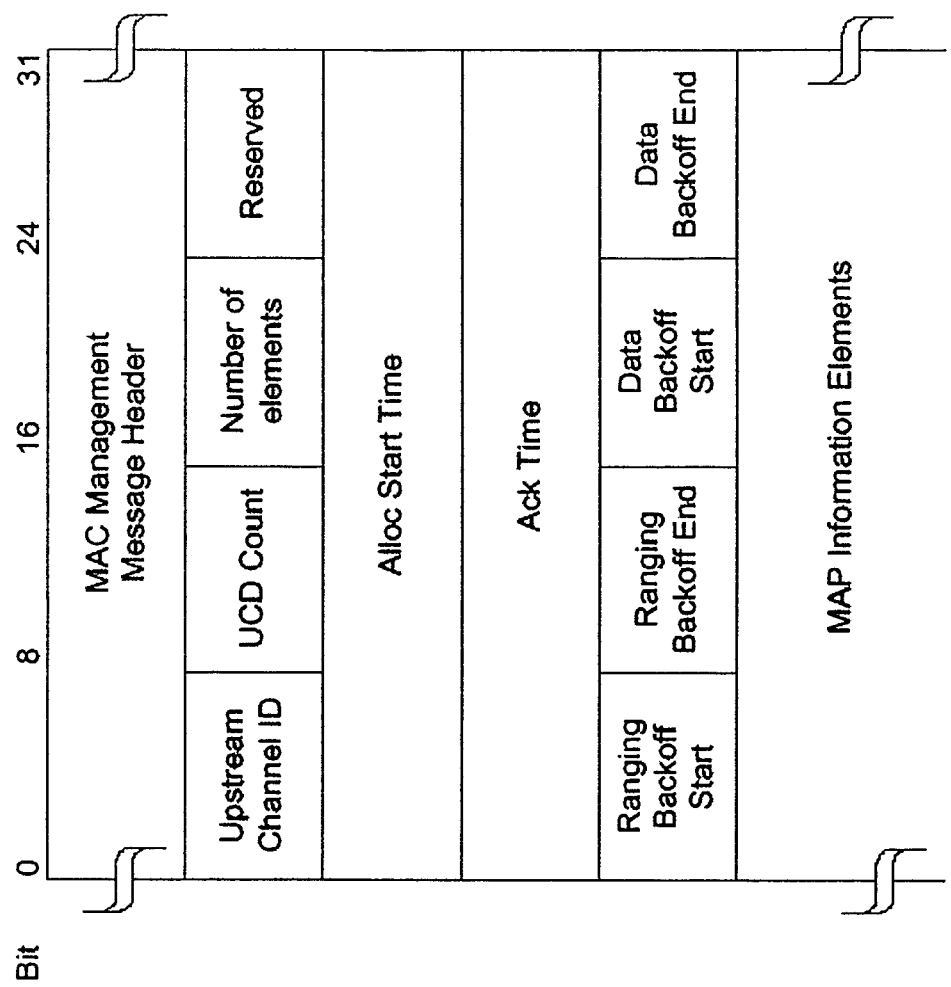
FIG. 6 illustrates an upstream bandwidth allocation MAP message.
Figure 7:
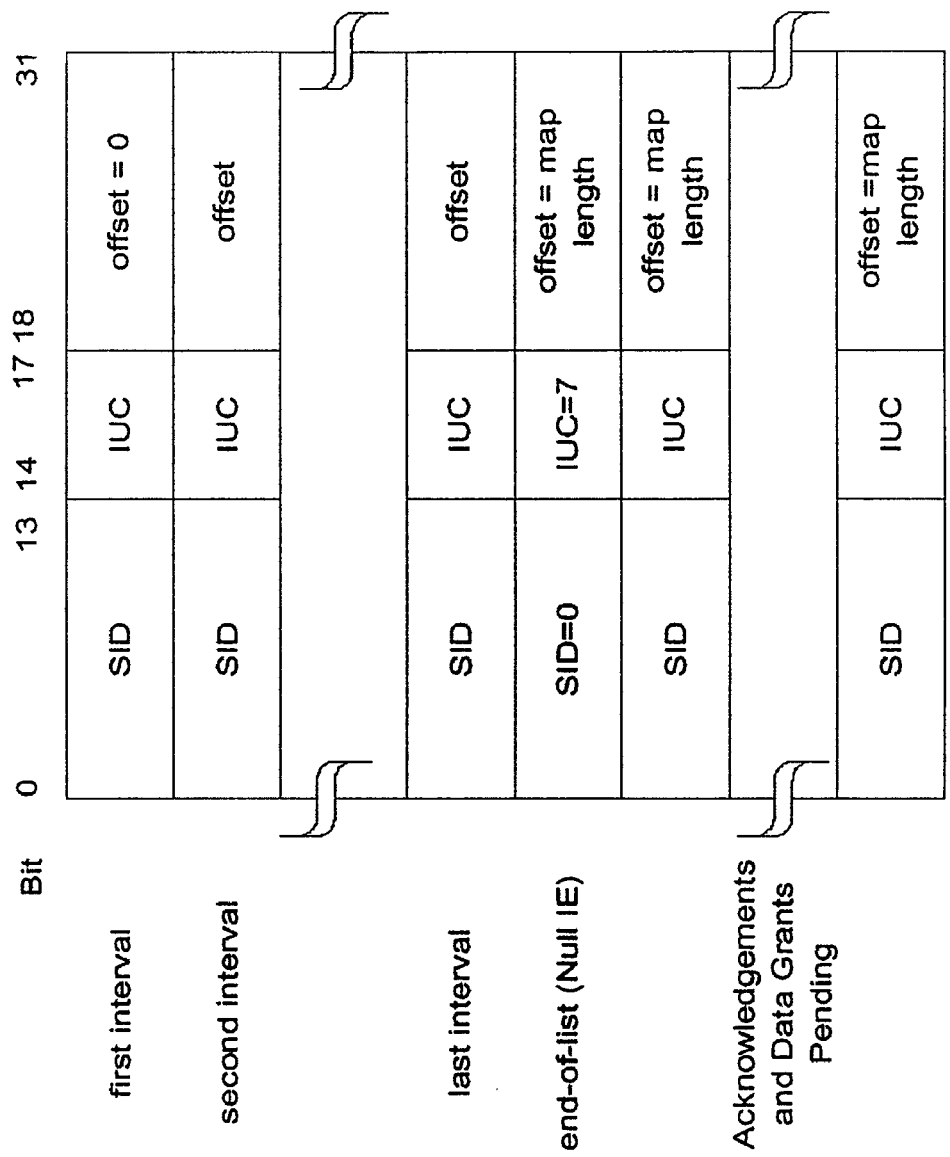
FIG. 7 illustrates the format of Information Elements.
Figure 8:
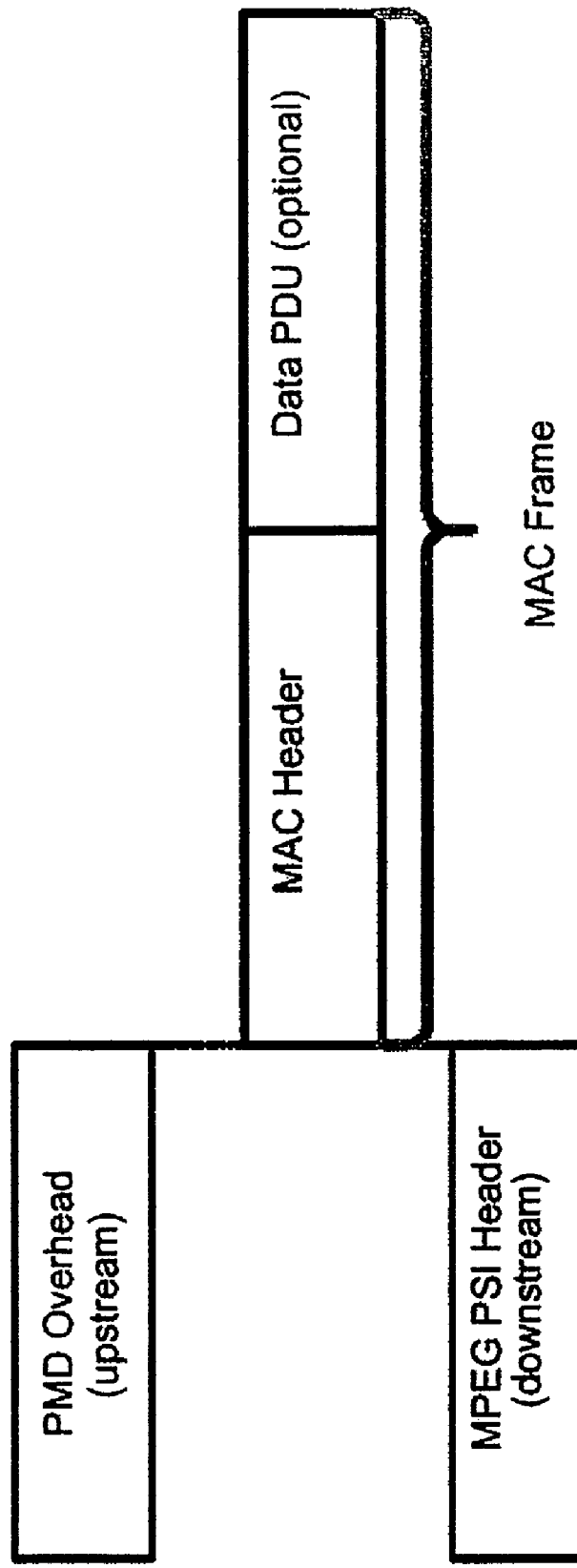
FIG. 8 illustrates the format of a DOCSIS MAC frame.
Figure 9:
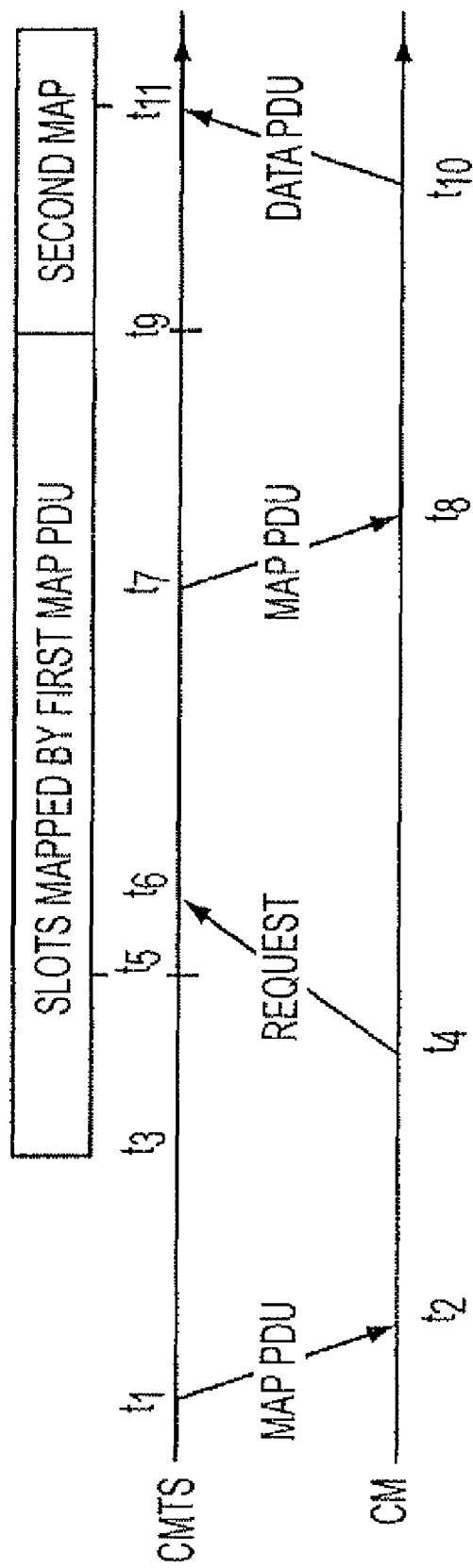
FIG. 9 illustrates the interchange between the CM and the CMTS when the CM has data to transmit Suppose a given CM has a data PDU available for transmission.
Figure 10:
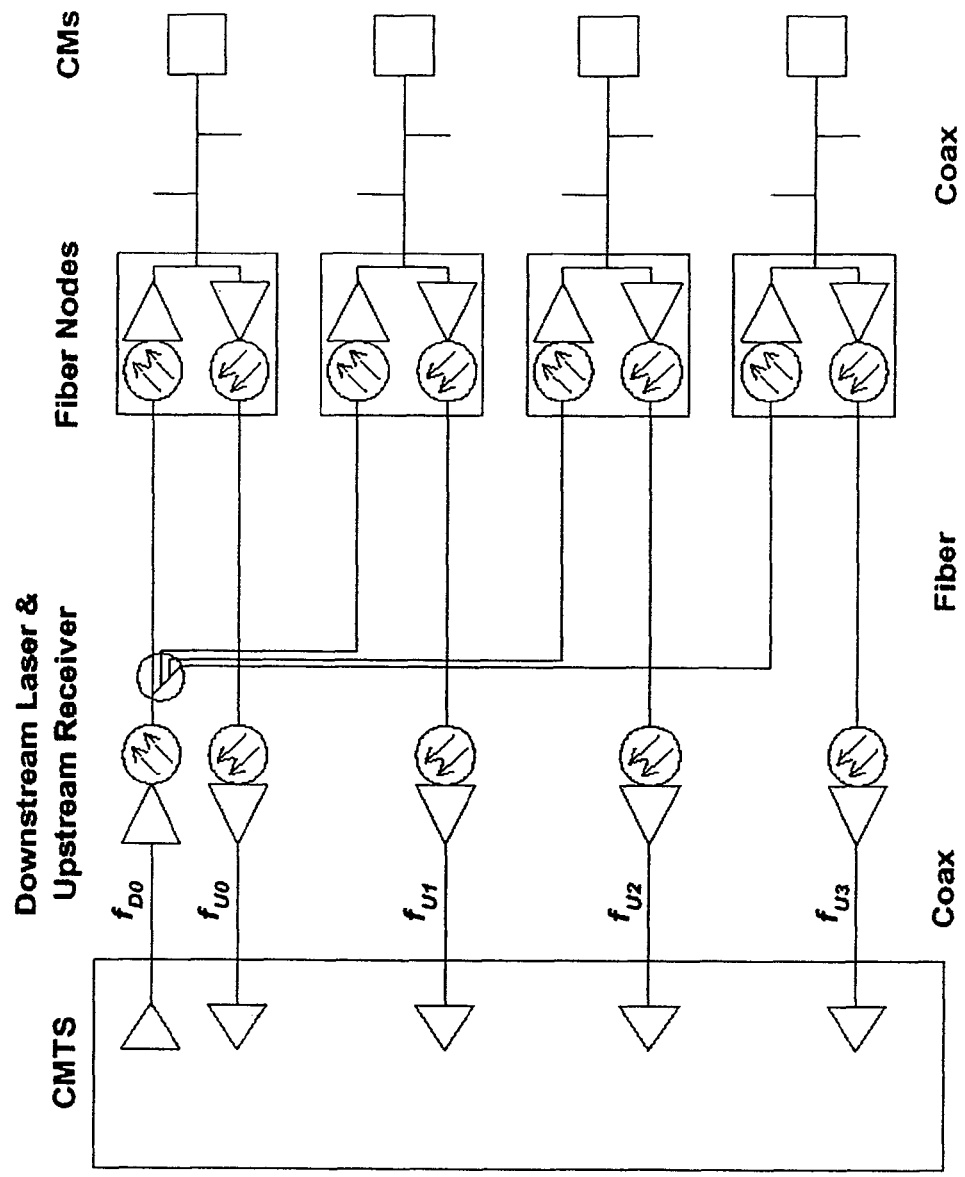
FIG. 10 illustrates an example of a single downstream channel and four upstream channels.
Figure 11:
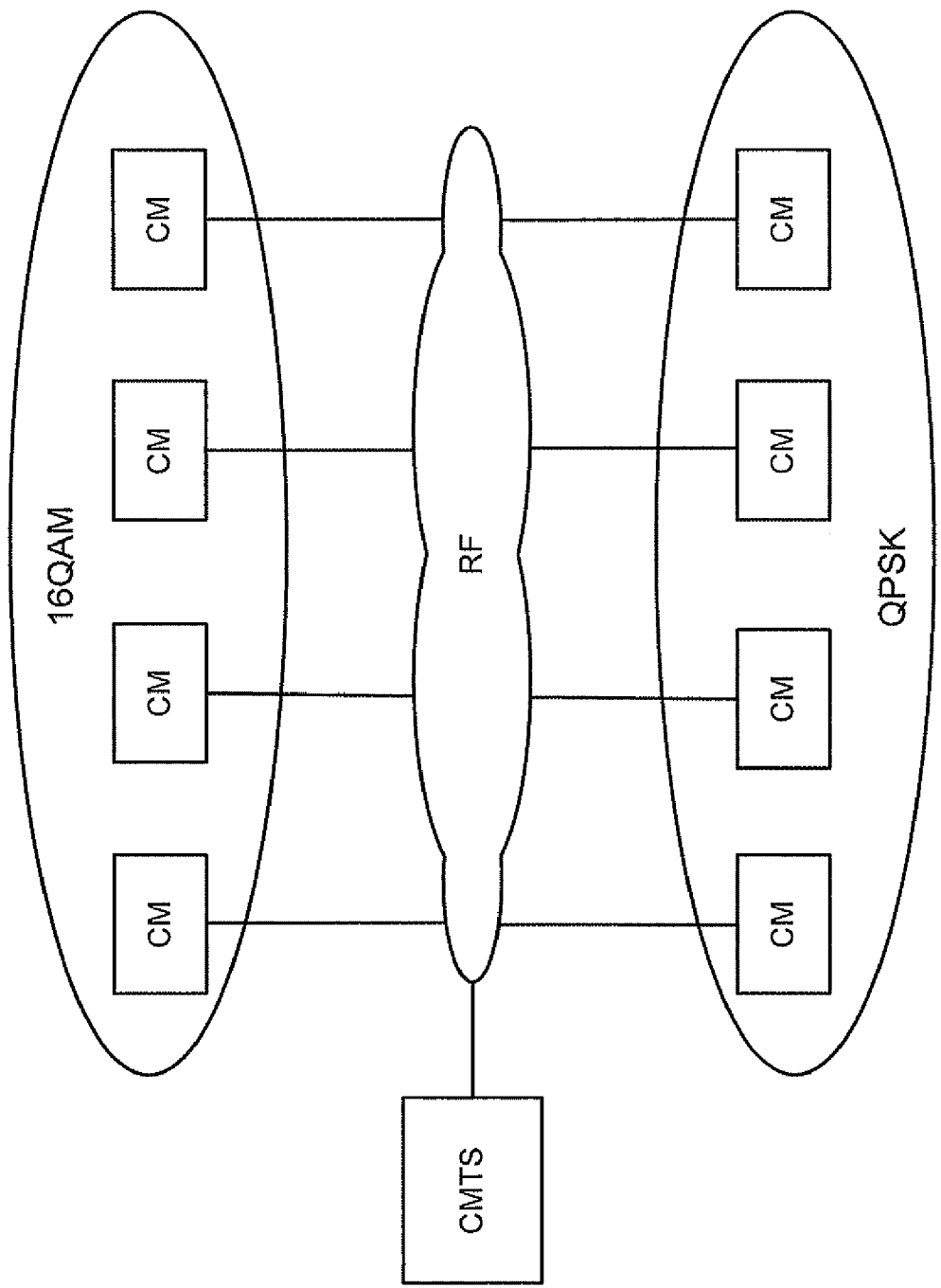
FIG. 11 illustrates a DOCSIS System with cable modems of different noise levels.
Figure 12:
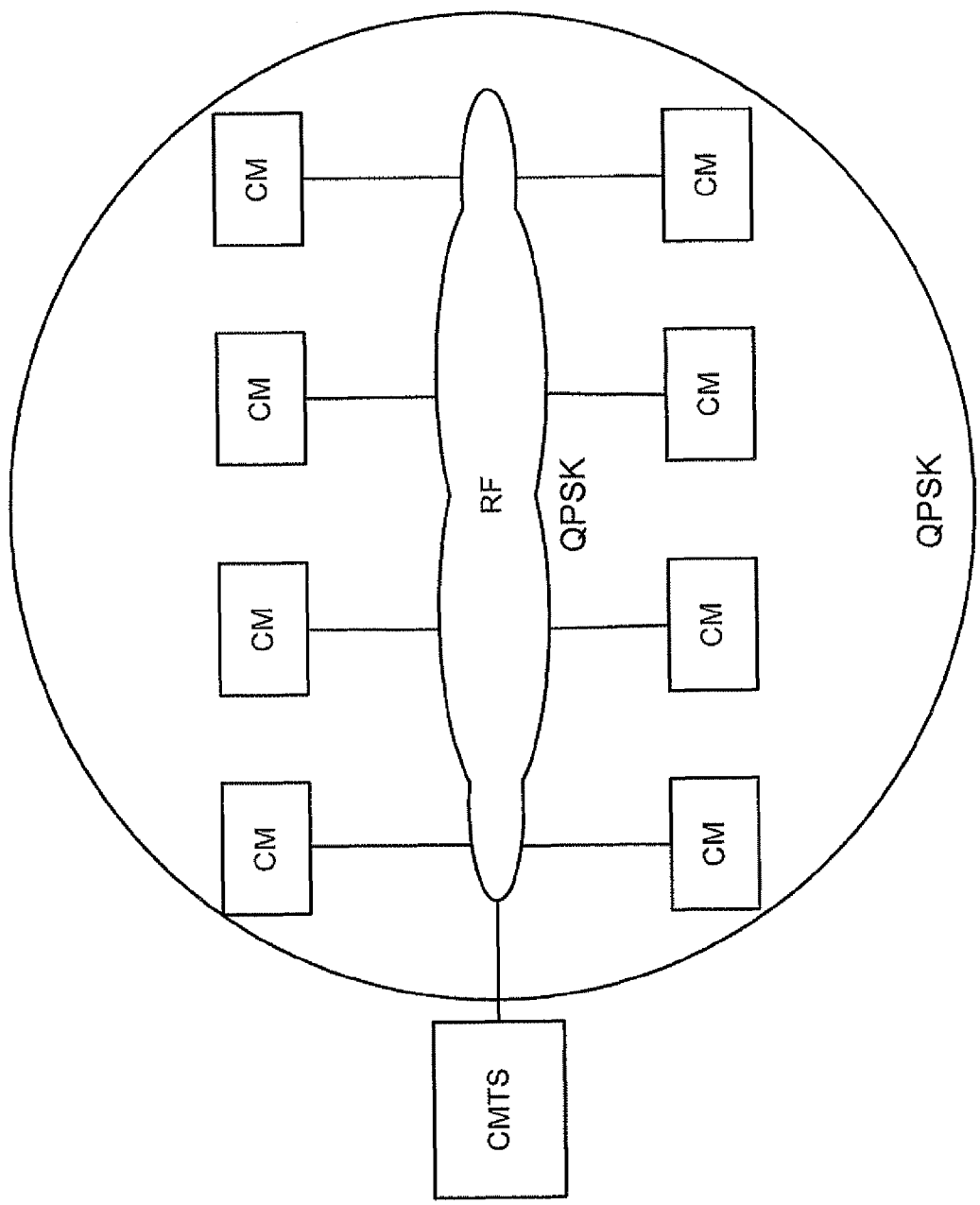
FIG. 12 illustrates a DOCSIS System with cable modems forced to operate using QPSK modulation.
Figure 13:
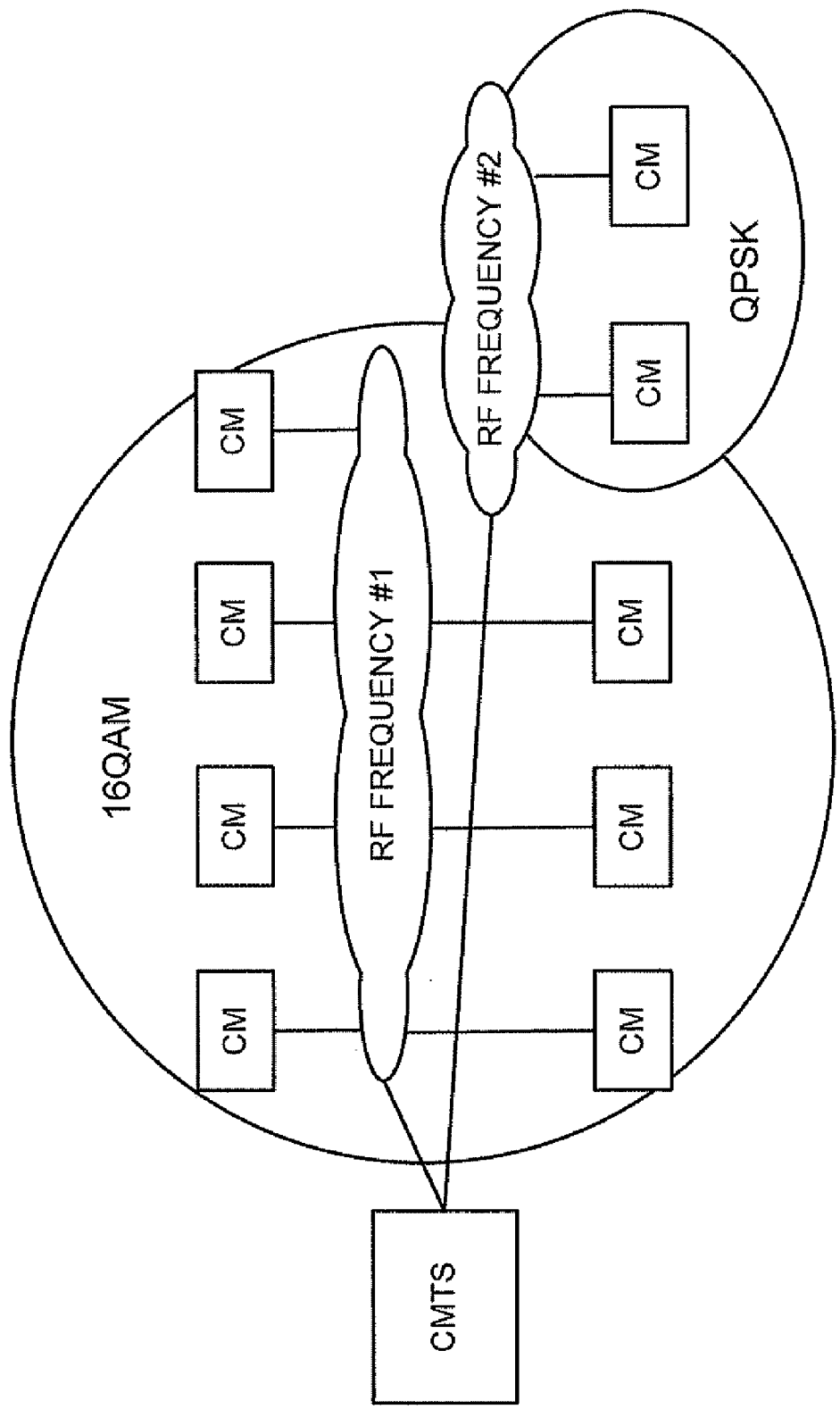
FIG. 13 illustrates an unequal number of CMs with different noise margins.
Figure 14:
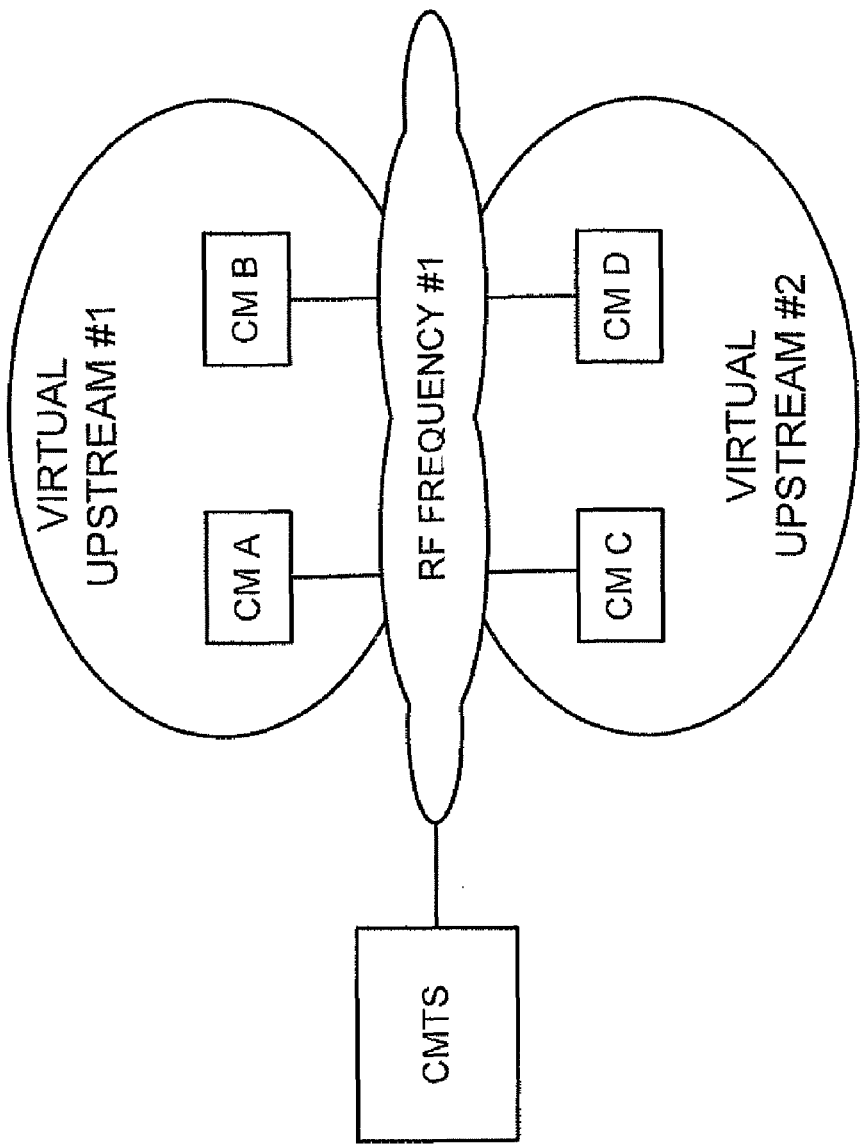
FIG. 14 illustrates virtual upstream channels and associated cable modems which are serviced by the scheduling system of the invention.

The CMTS can be configured to generate a MAP message for each virtual upstream channel. The effective result of sending a MAP message for each virtual upstream channel will be to decrease overall utilization of the downstream channel. Referring to FIG. 14, for example, assume that the virtual channel #1 and virtual upstream channel #2 share the same frequency (i.e. the same physical upstream channel). And further, assume that the virtual upstream channel #1 has two CMs A and B assigned to it, and that the virtual upstream channel #2 has two CMs C and D assigned it. Also, assume that virtual upstream channel #1 is working in a QPSK modulation scheme and virtual upstream channel #2 is working in a 16-QAM modulation scheme.

Figure 15:
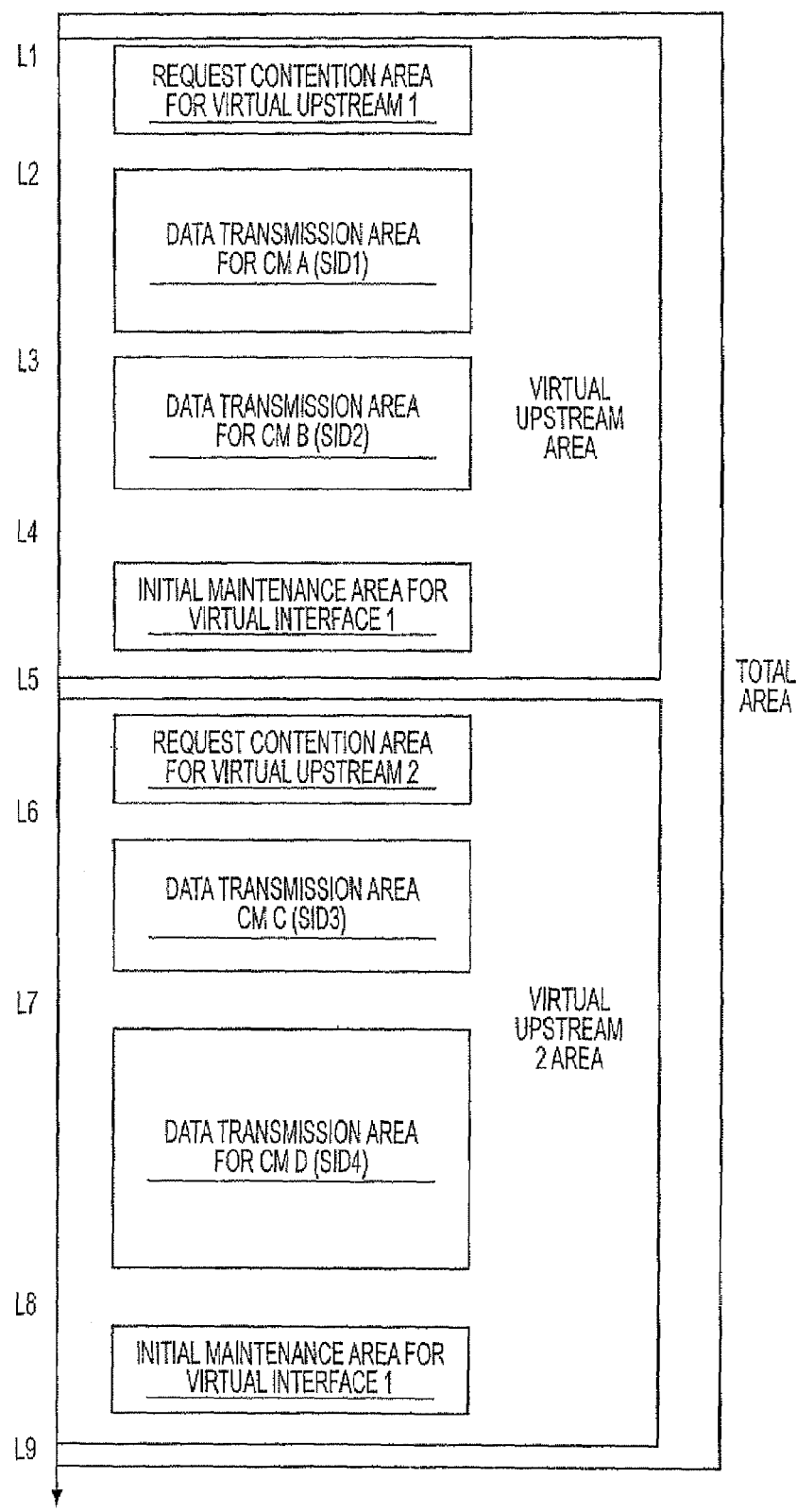
FIG. 15 illustrates an exemplary time division multiplexing of two virtual upstream channels.

An exemplary time division multiplexing of such a configuration is depicted in FIG. 15. Virtual upstream channel #1 uses the first available upstream timeframe between t1 and t5.

Afterwards, virtual upstream channel #2 uses the remaining upstream timeframe from t5 to t9. For this example of upstream channel division, the CMTS will generate two bandwidth allocation MAP messages as follows:

IEs of the Bandwidth Allocation Map for the Virtual Upstream Channel #1

| SID | IUC | Offset |
| --- | --- | --- |
| x3FFF | 1 | t1 |
| x0001 | 6 | t2 |
| x0002 | 6 | t3 |
| x3FFF | 3 | t4 |
| x0000 | 6 | t5 |
| x0000 | 0 | t9 |

IEs of the Bandwidth Allocation Map for the Virtual Upstream Channel #2

| SID | IUC | Offset |
| --- | --- | --- |
| x0000 | 6 | t1 |
| x3FFF | 1 | t5 |
| x0003 | 6 | t6 |
| x0004 | 6 | t7 |
| x3FFF | 3 | t8 |
| x0000 | 0 | t9 |

The above example assumes that the virtual upstream Channels use different symbol rates, preambles or mini-slot sizes such that it is not possible (or may be desired) for each group to share the request contention area or initial ranging area. Such "joint request contention areas" are covered in further detail below. The null SID x0000 is used as a space holder to state that another CM will perhaps use the timeframe. In the above case, in the time area defined between offset t1 through t5, the MAP of virtual upstream channel #2 has a null SID, indicating that another virtual upstream channel could be transmitting in that time area. When this is considered along with the MAP for virtual upstream channel #1, which indicates that its CMs (SIDs x0001 and x0002) are transmitting during this time, then it can be observed that the virtual upstream channel #2 does not interfere in the transmission area of virtual upstream channel #1. Likewise, the MAP message for virtual upstream channel #1 shows a null SID during the time area defined by offset t5 through t9, indicating that another virtual upstream channel is using that time area. When viewed in conjunction with the MAP message for virtual upstream channel #2, it can be observed that virtual upstream channel uses the time from t5 through t9 for its transmission. The greater the number of virtual upstreams, the more complex is the synchronization of MAP messages but the same principles would apply. For instance, three virtual upstream channels would have three MAP messages, each MAP message reflecting two time areas that it cannot use and one time area that it does use. It is possible to use the SID(s) that belong to other virtual upstream channels in these spaces. The above-mentioned bandwidth allocation MAP messages can be reduced in size if the assumption (not a DOCSIS requirement) that the bandwidth allocation MAP messages should cover the entire timeframe is relaxed. In this case, the messages with the null SID (x0000) can be deleted and the bandwidth allocation MAP messages would become as follows:

IEs of the Bandwidth Allocation Map for the Virtual Upstream Channel 1:

| SID | IUC | Offset |
|---|---|---|
| x3FFF | 1 | t1 |
| x0001 | 6 | t2 |
| x0002 | 6 | t3 |
| x3FFF | 3 | t4 |
| x0000 | 0 | t5 |

IEs of the Bandwidth Allocation Map for the Virtual Upstream Channel 2:

| SID | IUC | Offset |
|---|---|---|
| x3FFF | 1 | t5 |
| x0003 | 6 | t6 |
| x0004 | 6 | t7 |
| x3FFF | 3 | t8 |
| x0000 | 0 | t9 |

Each of the above MAP messages have information that only pertains to CMs within the virtual upstream channels that they service. It can be inferred that since offset t5 through t9 is only defined in the MAP message for virtual upstream channel #2, that the other areas defined by other offsets are not used by virtual upstream channel #2. The CMs in each virtual upstream channel group will be within the same MAC domain, and thus, each of the CMs in an upstream frequency will have unique SID.

Figure 16:
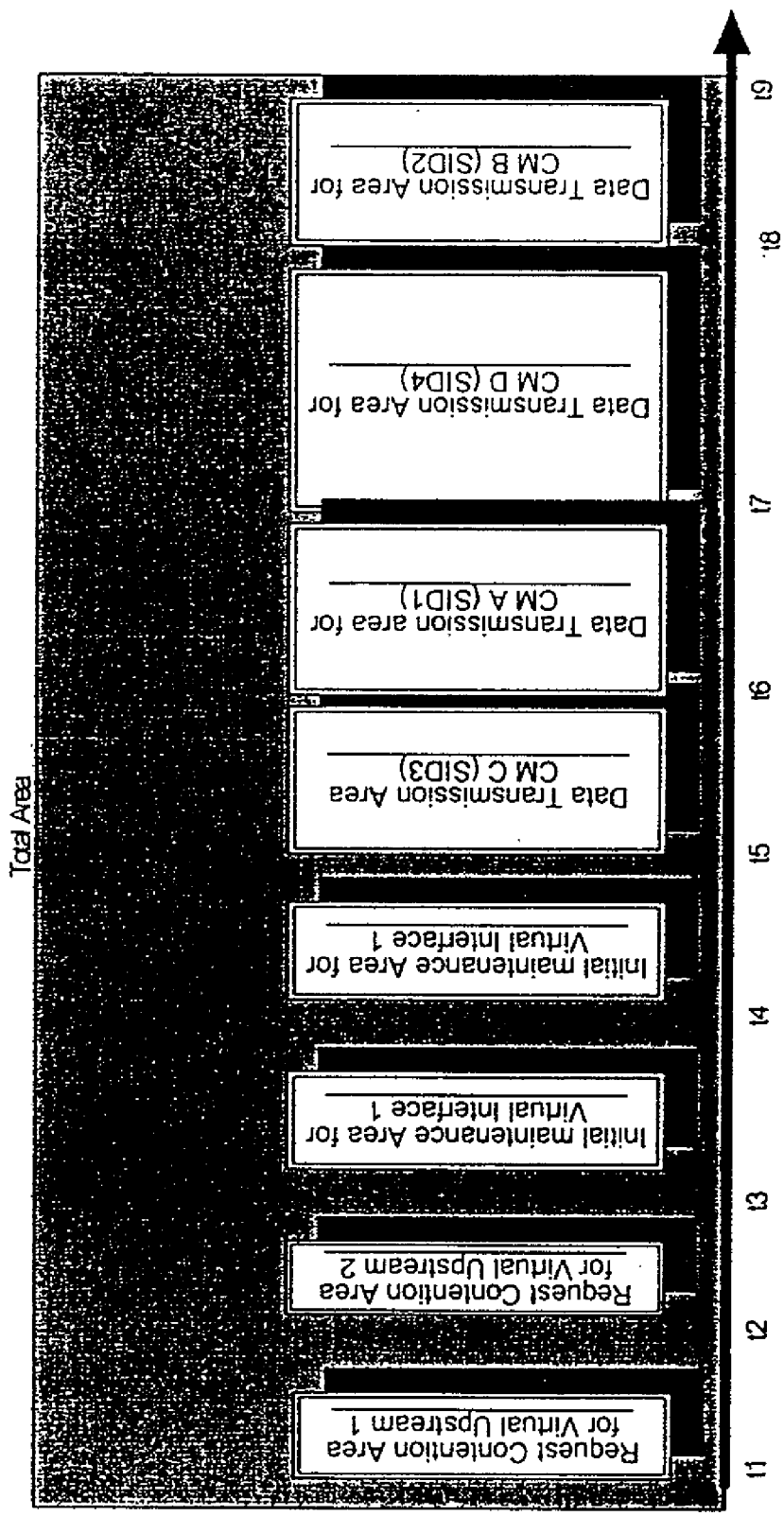
FIG. 16 illustrates another example of the division of upstream channel transmission time.

Another example of division of the upstream channel transmission time is depicted in FIG. 16. In this example, the virtual upstream channels have a distributed and haphazard time area division. Such a division may be due to quality of service guarantees and other requirements. As shown, the total transmission time (area) defined from offset t1 to offset t9 is shared in an alternating fashion by both virtual upstream channel #1 and virtual upstream channel #2. Data transmission (at offset t5 to offset t6) from CM C (which belongs to virtual upstream channel #2) is followed by data transmission (at offset t6 to offset t7) from CM A (which belongs to virtual upstream channel #1). Then, data transmission (at offset t7 to offset t8) from CM D (which belongs to virtual upstream channel #2) is followed by data transmission (at offset t8 to offset t9) from CM A (which belongs to virtual upstream channel #1). In such a case, the two MAP messages would look like:

IEs of the Bandwidth Allocation Map for the Virtual Upstream Channel #1

| SID | IUC | Offset |
|---|---|---|
| x3FFF | 1 | t1 |
| x0000 | 6 | t2 |
| x3FFF | 3 | t3 |
| x0000 | 6 | t4 |
| x0001 | 6 | t6 |
| x0000 | 6 | t7 |
| x0002 | 6 | t8 |
| x0000 | 7 | t9 |

IEs of the Bandwidth Allocation Map for the Virtual Upstream Channel #2

| SID | IUC | Offset |
|---|---|---|
| x0000 | 1 | t1 |
| x3FFF | 6 | t2 |
| x0000 | 3 | t3 |
| x3FFF | 6 | t4 |
| x0003 | 6 | t5 |
| x0000 | 6 | t6 |
| x0004 | 6 | t7 |
| x0000 | 6 | t8 |
| x0000 | 7 | t9 |

Instead of using null IEs (i.e. SIDs of x0000), if we assume that CMs will be acting as specified by DOCSIS then it is possible to use instead of nulls, only the SID values that use the actual channel. In such a case, then the MAP messages will look like:

IEs of the Bandwidth Allocation Map for the Virtual Upstream Channel #1

| SID | IUC | Offset |
|---|---|---|
| x3FFF | 1 | t1 |
| x0000 | 6 | t2 |
| x3FFF | 3 | t3 |
| x0000 | 6 | t4 |
| x0003 | 6 | t5 |
| x0001 | 6 | t6 |
| x0004 | 6 | t7 |
| x0002 | 6 | t8 |
| x0000 | 7 | t9 |

IEs of the Bandwidth Allocation Map for the Virtual Upstream Channel #2

| SID | IUC | Offset |
|---|---|---|
| x3FFF | 1 | t1 |
| x0000 | 6 | t2 |
| x3FFF | 3 | t3 |
| x0000 | 6 | t4 |
| x0003 | 6 | t5 |
| x0001 | 6 | t6 |
| x0004 | 6 | t7 |
| x0002 | 6 | t8 |
| x0000 | 7 | t9 |

In the case where is a need for a number of place holder SIDs that cannot be used for other purposes. The four basic SIDs per unspecified Virtual Upstream Channel denote:
Request;
REQ/Data; and
Initial Maintenance.

Depending on the complexity of the MAP messages, the number of place holder SIDs would increase. It is possible to use the unused other channel SID values for place holders thereby practically reducing the number of place holder SIDs to zero.

CMTS Scheduler Bandwidth Calculation

The complexity of the CMTS scheduler depends upon the type and variance of quality of service constraints. The below exemplifies some of the variations of schedulers depending on quality of service constraints.

The first of these, is for the CMTS Scheduler to provide best effort services for the utilization of the upstream channel. The basic idea is to increase upstream channel utilization. In order to do so, the various groups of cable modems use different modulation/preamble/mini-slot size/symbol rate and other than that, the scheduler needs no special conditions placed upon it.

One means of achieving this is to map all the bandwidth requests into a unified form and then process it. For example, if virtual upstream channel #1 is using a symbol rate of 160 kilo-symbols per second while virtual upstream channel #2 is using a symbol rate of 320 kilo-symbols per second then all that has to be done is to convert everything into timer ticks and then schedule the timer ticks using the table given in Appendix A. The result of such a scheduler might most probably be as depicted in FIG. 16.

Another of these variations in quality of service, is for the CMTS Scheduler to provide best effort latency differentiation. In this case, the scheduler uses different MAP intervals for the two virtual upstream channels (assuming two virtual upstream channels as in the example above). The scheduler design is more complex in this case than in the best effort of utilization case since simple request translation into the fastest channel would not be sufficient. Another issue that complicates the scheme is that the use of DOCSIS advanced quality of service constraints. If the scheduler and MAP intervals do not follow some rules, it is possible that the two virtual upstream channels cannot meet their quality of service constraints due to conflicting requirements.

These kinds of conflicts are very easy to solve if the flow admission control is intelligent and especially the UGS (unsolicited grant service) flows are admitted knowing about the all virtual upstream channels that share the same physical upstream frequency.

The Use of IEs SID Values Between Virtual Upstream Channels

If virtual upstream channels are being used, the CMTS has to send the bandwidth allocation messages in such a way that no two CMs would send their non-contention area frame in the timeframe allocated for the other unless it is an intentional action. An example of such kind of a desired behavior is to content some number of modems to release their queue from unwanted IP packets that are waiting to be transmitted. In other words, the scheduler gives the unicast data opportunities in such a way that in the MAP messages that in all of the MAP messages there is only one MAP message that gives unicast data opportunity that has a Cable Modem which has requested bandwidth and is waiting to transmit its data.

Referring back to the example of FIG. 14, it is possible for the CMTS to construct two virtual upstream channels in the same DOCSIS physical upstream frequency thereby increasing the utilization of the DOCSIS upstream frequency, and at the same time not using a new DOCSIS physical upstream frequency. In the system that is depicted, the CMTS associates two Upstream Channel Descriptors (UCDs) with the same frequency.

One means of organizing the various opportunities provided in a physical upstream frequency that uses two virtual upstream channels is shown in Table 2. Table 2 shows time synchronized mapping of IEs that belong to two virtual upstream (VU) channels that share the same upstream frequency and cable segment.

TABLE 2

Mapping of IEs, transmit opportunities.

| | IEs of VU Channel #1 | IEs of VU Channel #2 |
|---|---|---|
| 1 | Unicast transmission opportunity for a VU 1 CM | A transmission opportunity that no CM that belongs to VU 2 would use |
| 2 | A transmit opportunity that no CM that belongs to VU 1 would use | Unicast transmission opportunity for a VU 2 CM |
| 3 | Unicast transmission opportunity for a VU 1 CM | Unicast transmission opportunity for a VU 2 CM |
| 4 | Broadcasted transmission opportunity for CMs that belong VU 1 | A transmission opportunity that no CM that belongs to VU 2 would use |
| 5 | A transmission opportunity that no CM that belongs to VU 1 would use | Broadcasted transmission opportunity for CMs that belong VU 2 |
| 6 | Broadcasted transmission opportunity for CMs that belong VU 1 | Broadcast transmission opportunity for CMs that belong VU 2 |
| 7 | Multicast transmission opportunity for a VU 1 CM | A transmission opportunity that no CM that belongs to VU 2 would use |
| 8 | A transmit opportunity that no CM that belongs to VU 1 would use | Multicast transmission opportunity for a VU 2 CM |
| 9 | Multicast transmission opportunity for a VU 1 CM | Multicast transmission opportunity for a VU 2 CM |

The CMTS, in this example, would be sending two bandwidth allocation MAP messages which does not allocate the time that one virtual upstream on the same channel is using to the other virtual upstream(s) that share the same frequency. This is depicted in Table 2 showing MAP messages that are sent to two virtual upstream channels. It is possible to extend the table to more than two virtual upstream channels but for sake of simplicity such a table it is not described. For ease of understanding, the case of two virtual upstream channels per upstream frequency is given as example. The concepts that apply to the two virtual upstream channels per frequency case can be extended to cases where there are more than two virtual upstream channels per frequency case as well.

In Table 2, the first type of transmission opportunity is a unicast transmission opportunity that is being used by virtual upstream channel #1 and the MAP of virtual upstream channel #2 points to an opportunity that is known that no CM would transmit. This can be a unicast transmission opportunity given to a null SID, or to a SID that does not belong to virtual upstream channel #2 and therefore, will not be parsed by the CM owning that SID.

The second type of transmission opportunity is the same as the first one but with the difference that this time the transmission opportunity belongs to a CM that belongs to virtual upstream channel #2 and virtual upstream channel #1 points to an transmission opportunity that is known that no CM would transmit. The first two kinds of transmission opportunities can be referred to as "unicast" data opportunities due to the fact that it is made sure that the transmission will not be contended by any other CM.

The third type of opportunity is the one in which two CMs are allowed to transmit data. These can be polled data request areas or intentional data contention to get rid of the data backlog in the CMs. The CMTS scheduler is responsible to make sure that the expected behavior is executed.

The fourth type of transmission opportunity is that the CMs on virtual upstream channel #1 are given a transmission opportunity and the MAP of virtual upstream channel #2 points to an opportunity where it is known that no CM would transmit. This type of behavior is typical when virtual upstream channel #1 is in the request contention area and virtual upstream channel #2 needs to be prohibited from utilizing the area.

The fifth type of transmission opportunity is the same as the fourth one but this time only the CMs in virtual upstream channel #2 will be using the broadcasted transmission opportunity and the CMs in virtual upstream channel #1 will not use the timeframe.

The sixth type of transmission opportunity is the case where all the CMs in virtual upstream channels #1 and #2 can use the transmission opportunity.

The seventh type of transmission opportunity is the case where the given multicasted transmission opportunity will only be used by the CMs that belong to the in virtual upstream channel #1 and the CMs that belong in virtual upstream channel #2 will not transmit.

The eight type of transmission opportunity the same as the seventh one but this time only the CMs in virtual upstream channel #1 will be using the multicasted transmission opportunity and the CMs in virtual upstream channel #2 will not use the timeframe allotted.

The ninth type of transmission opportunity all the CMs in both in virtual upstream channels #1 and #2 can use the transmission opportunity.

Synchronization of IE Offsets Between VU Channels

It should be noted that the Is in both MAPs should be time aligned for the transmission opportunities. Sometimes this may cause some time to be wasted in order to synchronize both virtual upstream channel bandwidth allocation MAP IEs.

TABLE 3

IE synchronization wasting bandwidth due to mini-slot/symbol rate differences.

| | IEs of VU Channel #1 | | | IEs of VU Channel #2 | | |
|---|---|---|---|---|---|---|
| | SID | IUC | Offset | SID | IUC | Offset |
| 1 | 00x0001 | 6 | 5 | 0x0000 | 6 | 1 |
| 2 | 00x0000 | 6 | 123 | | | |
| 3 | 0x0000 | 6 | 384 | 0x0002 | 6 | 3 |
| 4 | 00x0003 | 6 | 120 | 0x0000 | 6 | 1 |
| 5 | 00x0000 | 6 | 8 | | | |

In Table 3, assume that virtual upstream channel 41 uses a mini-slot size that is equivalent to 1 ticks (6.25 microseconds) and in virtual upstream channel #2 uses a 128 ticks (800 microseconds) long mini-slot. Furthermore, assume that at the beginning of IE 1, both IEs point to the same time.

Virtual upstream channel #1 gives a unicast data opportunity for 5 mini-slots. Consequently, the MAP on virtual upstream channel #2 cannot give an opportunity smaller than one mini-slot so it gives a non-CM unicast data opportunity of 1 mini-slot.

The next-in-time transmission of virtual upstream channel #2 would start after 123 mini-slots. At that point, virtual upstream channel #2 does not have any data to transmit, but it has to fill the remaining 123 mini-slots. As shown above in Table 3, the remaining mini-slots are filled with non-CM unicast data opportunity of 123 mini-slots.

Instead of the Table 3 scenario, the two non-CM unicast transmission opportunities can be merged producing IEs such as those shown in Table 4.

TABLE 4

IE synchronization merging non-CM unicast transmission opportunities.

| | IEs of VU Channel #1 | | | IEs of VU Channel #2 | | |
|---|---|---|---|---|---|---|
| | SID | IUC | Offset | SID | IUC | Offset |
| 1 | 0x0001 | 6 | 5 | 0x0000 | 6 | 1 |
| 2 | 0x0000 | 6 | 507 | 0x0002 | 6 | 3 |
| 3 | | | | | | |
| 4 | 0x0003 | 6 | 120 | 0x0000 | 6 | 1 |
| 5 | 0x0000 | 6 | 8 | | | |

It would be optimal if the CMTS scheduler took these synchronization issues into account and scheduled such that the synchronization will be minimized. If we return to Table 3 and re-organize the IEs, the result will be Table 5.

TABLE 5

IE synchronization optimizing for synchronization waste reduction.

| | SID | IUC | Offset | SID | IUC | Offset |
|---|---|---|---|---|---|---|
| 1 | 0x0001 | 6 | 5 | 0x0000 | 6 | 1 |
| 3 | 0x0003 | 6 | 120 | | | |
| 3 | 0x0000 | 6 | 131 | | | |
| 4 | | | | 0x0002 | 6 | 3 |

In describing the invention, offset calculations will be based on the same units for the sake of simplicity. Even though the examples use the same mini-slot size, this is merely a simplification for illustrative purposes. The actual bandwidth allocation MAP messages may be much complicated due to mini-slot size differences and/or the offset synchronization issues.

Grouping Users into Different Latency Groups

Figure 17:
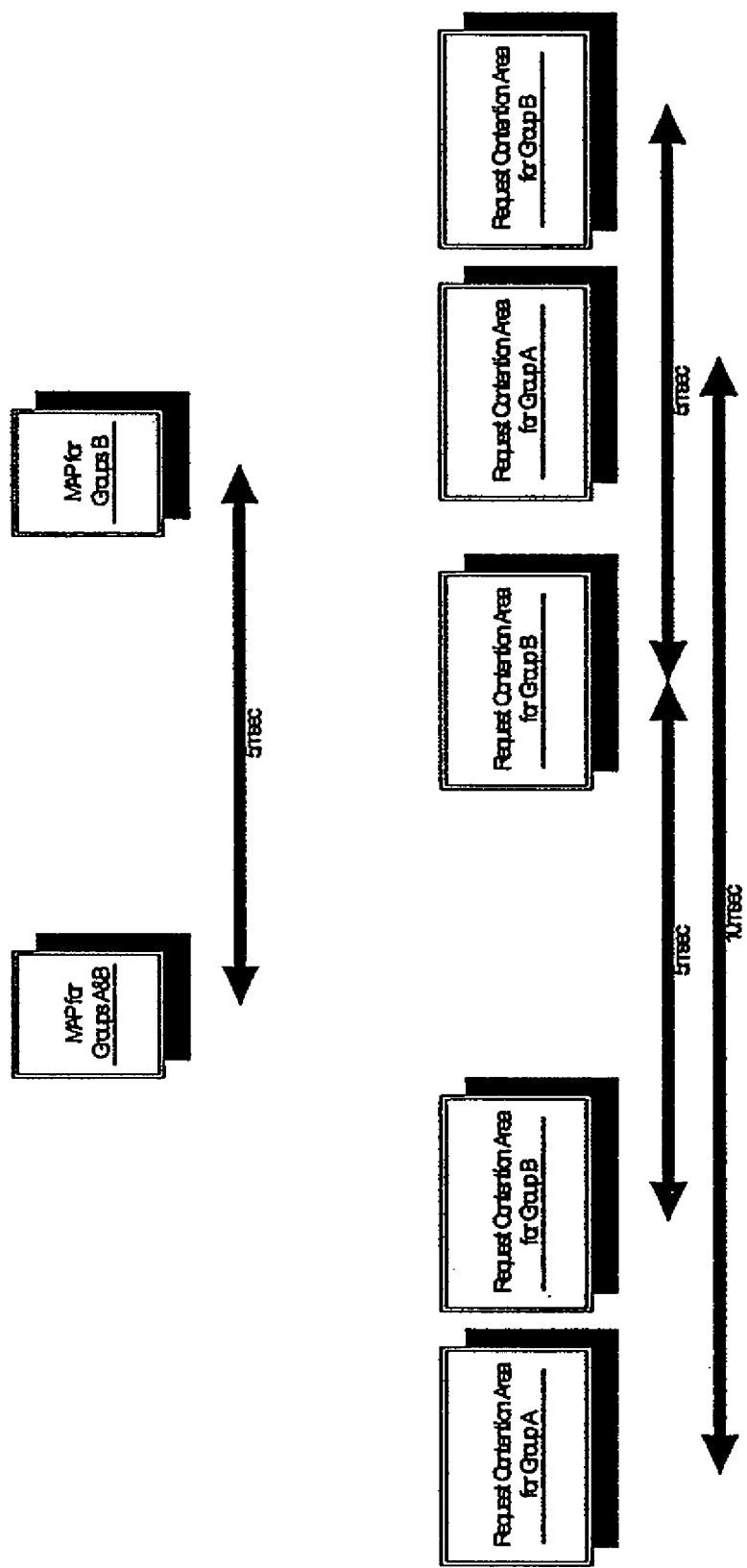
FIG. 17 illustrates virtual upstream channels with different request contention area latencies.

FIG. 17 illustrates virtual upstream channels with different request contention area latencies. Using virtual upstream channels with the same upstream properties, it is possible to group CMs into different pools such that each user belonging to different groups will perceive different latency. The latency in this context is defined as the time that it takes a CM to receive a packet that is to be send to upstream to the packet is received by the CMTS through upstream.

Since the interval of request contention opportunities and bandwidth allocation MAP messages are directly proportional to the latency perceived by the users, using virtual upstream channels, the users can be grouped into different groups that would perceive different latencies. For example it is possible that one group A will see a request contention area every 10 milliseconds and other group of users B will see a request contention area every 5 milliseconds as shown in FIG. 17.

For example now it is possible to segregate the users into provider-1 and provider-2 groups and have each user in one group not to contend with the other groups bandwidth request opportunities. If one upstream channel is to be used, then all the users on the request contention area have to compete with each other and the CMTS would only make its decision on who gets what amount of bandwidth depending on the requests it received.

If the above example is to be expanded, assume that provider-1 and provider-2 has 10 users each in the upstream channel. Further assume that in general the 45 provider-1 users use the upstream while 5 provider-2 users are online (using the downstream). Even though the main idea for provider-2 to is to supply a better service to their users, because of the peculiarity of the DOCSIS services, the request contention opportunity (best efforts per DOCSIS) is the best matching service type for Internet browsing (mainly downstream). The other choice of request types such as real-time/non-real time polling and unsolicited grant service would incur a large overhead on the upstream. Since the upstream has one request contention opportunity for all the users, all the users would have same chances of getting their packets to CMTS. This is not fair due to the fact that the provider-2 tried to limit the number of users in their network. In busy times, even though the provider-2 has sufficient bandwidth, its users will be hit as the provider-1's users are using most of the contention request opportunities and all the CMs as the same chances of contenting their requests.

If the request contention areas of the two providers are to be separated using virtual upstream channels, then the users of the two providers would not have to compete for the same request contention opportunities. Instead, they can engineer their services without worrying about other over-subscribing people.

Figure 18:
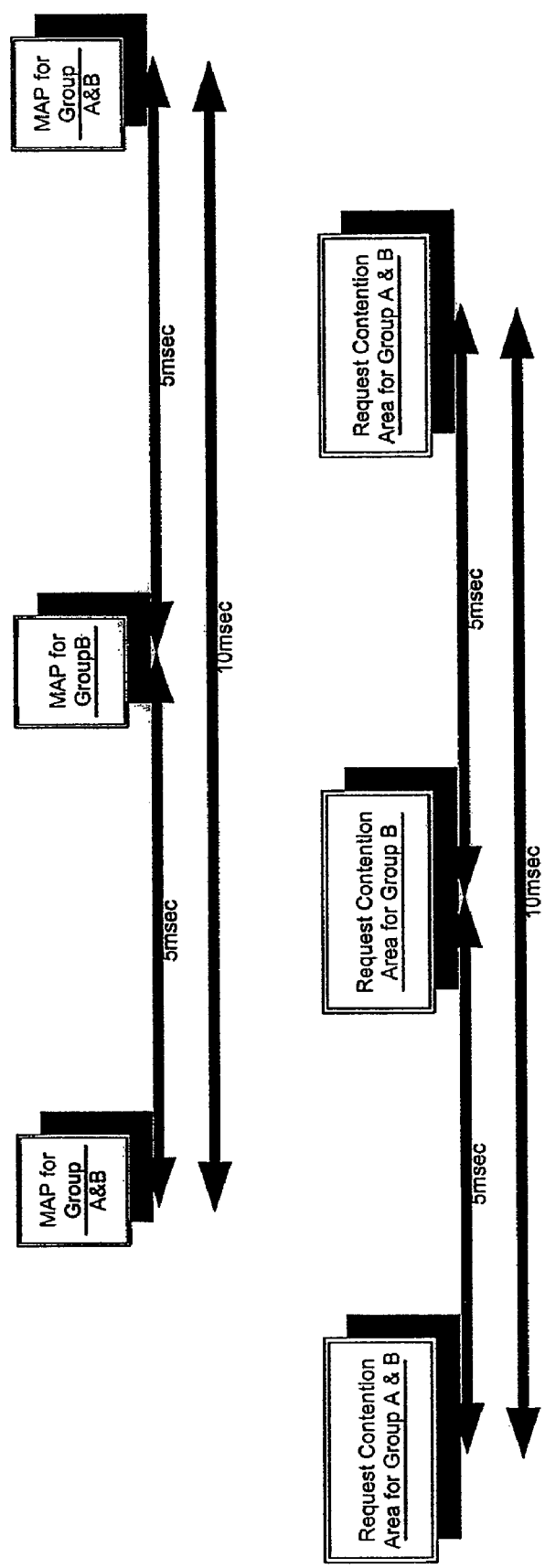
FIG. 18 illustrates virtual upstream channels using joint contention areas.

FIG. 18 illustrates virtual upstream channels using joint contention areas. Joint contention areas use the same contention area for both groups. In this case, the two virtual upstream channels must have the same upstream characteristics. In other words, the two virtual upstream channels must have the same Upstream Channel Descriptors for request opportunities and the same symbol rate, mini-slot size, preamble etc. Using these kinds of techniques it is now possible to offer better responding services (e.g. for the purpose of gaming) for best-effort services for different classes/applications of CMs.

Grouping Users to Control the Number of SIDS that can Contend in a Request Contention Area One side effect of the request contention area scenarios is that in the worst case, all CMs can contest for the same time frame. Assuming 200 CMs in the same upstream, then it is possible to have 200 times the power of an individual modem at the frequency. This is an unlikely event, but as the number of CMs that use the channel increase (due to Advanced PHY for example) the probability that the contention areas will have increased power will also increase.

Another advantage of virtual upstream channels is that it can constrain the number of CMs that can transmit in a request contention area there by reducing the chances of laser clipping. It is possible to design virtual upstream channels such that laser clipping is eliminated. The probability of the laser clipping can be engineered without sacrificing the number of users supported on a DOCSIS upstream frequency. In such case, the design should ensure that the number that is found as the maximum number of CMs that can use a request contention area will be the threshold limit for the number of CMs sharing the same virtual upstream channel.

Although the present invention has been described in detail with reference to the disclosed embodiments thereof, those skilled in the art will appreciate that various substitutions and modifications can be made to the examples described herein while remaining within the spirit and scope of the invention as defined in the appended claims. Also, the methodologies described may be implemented using any combination of software, specialized hardware, firmware or a combination thereof and built using ASICs, dedicated processors or other such electronic devices.

What is claimed is:

1. A method performed by a device, the method comprising:
   grouping, by the device, a first plurality of cable modems into a first group of cable modems, where the first plurality of cable modems is associated with a downstream channel;
   grouping, by the device, a second plurality of cable modems, different from the first plurality of cable modems, into a second group of cable modems, where the second plurality of cable modems is associated with the downstream channel;
   assigning, by the device, a first virtual upstream channel to the first group of cable modems, where the first virtual upstream channel is operating in a first modulation scheme;
   assigning, by the device, a second virtual upstream channel to the second group of cable modems, where the second virtual upstream channel is operating in a second modulation scheme that is different from the first modulation scheme;
   generating, by the device, a first bandwidth allocation message for the first virtual upstream channel; and
   generating, by the device, a second bandwidth allocation message, different than the first bandwidth allocation message, for the second virtual upstream channel, where the first and second bandwidth allocation messages decrease overall utilization of the downstream channel.

2. The method of claim 1, further comprising:
   determining that the first virtual upstream channel and the second virtual upstream channel share a same physical channel associated with the first plurality of cable modems and the second plurality of cable modems; and
   scheduling transmission of data on the same physical channel so that the first and second virtual upstream channels do not simultaneously use the same physical channel.

3. The method of claim 1, further comprising:
   synchronizing the first and second bandwidth allocation messages so that transmission areas of the first and second bandwidth allocation messages do not overlap; and
   transmitting the first and second bandwidth allocation messages via a same physical channel associated with the first plurality of cable modems and the second plurality of cable modems.

4. The method of claim 3, where synchronizing the first and second bandwidth allocation messages comprises:
   receiving requests for bandwidth allocation from one or more of the first plurality of cable modems and the second plurality of cable modems;
   converting the requests into a common unit; and
   scheduling, based on the converted requests, transmission of data on the same physical channel.

5. The method of claim 1, where each of the first and second bandwidth allocation messages includes:
   one or more null service identifiers (SIDs); and
   one or more placeholder service identifiers (SIDs).

6. The method of claim 1, further comprising:
   allocating bandwidth to one or more of the first plurality of cable modems and the second plurality of cable modems based on quality of service constraints.

7. The method of claim 1, further comprising:
   allocating bandwidth to one or more of the first plurality of cable modems and the second plurality of cable modems based on latency differentiation.

8. The method of claim 7, where:
   the first plurality of cable modems and the second plurality of cable modems include:
   slower cable modems that transmit user data at a first rate, and faster cable modems that transmit user data at second rate, greater than the first rate; and the latency differentiation causes the slower cable modems to transmit user data proportionately more frequently than the faster cable modems.

9. The method of claim 1, where one of:

the first modulation scheme is a Quadrature Phase Shift Keying (QPSK) modulation scheme and the second modulation scheme is a 16-Quadrature Amplitude Modulation (QAM) modulation scheme; or the first modulation scheme is a 16-Quadrature Amplitude Modulation (QAM) modulation scheme and the second modulation scheme is a Quadrature Phase Shift Keying (QPSK) modulation scheme.

10. The method of claim 1, where the device comprises a cable modem termination system (CMTS).

11. A cable modem termination system (CMTS), comprising:

one or more devices to:
grouping a first portion of a plurality of cable modems into a first group of cable modems, where the plurality of cable modems is associated with a downstream channel;

group a second portion of the plurality of cable modems, different than the first portion, into a second group of cable modems;

assign a first virtual upstream channel to the first group of cable modems, where the first virtual upstream channel is operating in a first modulation scheme;

assign a second, different virtual upstream channel to the second group of cable modems, where the second virtual upstream channel is operating in a second modulation scheme that is different from the first modulation scheme;

generate a first bandwidth allocation message for the first virtual upstream channel; and generate a second bandwidth allocation message, different than the first bandwidth allocation message, for the second virtual upstream channel, where the first and second bandwidth allocation messages decrease overall utilization of the downstream channel.

12. The CMTS of claim 11, where the one or more devices are further to:

determine whether the first virtual upstream channel and the second virtual upstream channel share a same physical channel associated with the plurality of cable modems; and schedule transmission of data on the same physical channel so that the first and second virtual upstream channels do not simultaneously use the same physical channel, when the first virtual upstream channel and the second virtual upstream channel share the same physical channel.

13. The CMTS of claim 11, where the one or more devices are further to:

synchronize the first and second bandwidth allocation messages so that transmission areas associated with the first and second bandwidth allocation messages do not overlap; and transmit the first and second bandwidth allocation messages via a same physical channel associated with the plurality of cable modems.

14. The CMTS of claim 13, where, when synchronizing the first and second bandwidth allocation messages, the one or more devices are to:

receive requests for bandwidth allocation from one or more of the plurality of cable modems;

convert the requests into a common unit; and schedule, based on the converted requests, transmission of data on the same physical channel.

15. The CMTS of claim 11, where the plurality of cable modems are grouped into the first group of cable modems and the second group of cable modems based on latencies associated with the first group of cable modems and the second group of cable modems.

16. The CMTS of claim 11, where each of the first and second bandwidth allocation messages includes:

one or more null service identifiers (SIDs); and one or more placeholder service identifiers (SIDs).

17. The CMTS of claim 11, where the one or more devices are further to:

allocate bandwidth to one or more of the plurality of cable modems based on quality of service constraints.

18. The CMTS of claim 11, where the one or more devices are further to:

allocate bandwidth to one or more of the plurality of cable modems based on latency differentiation.

19. The CMTS of claim 18, the plurality of cable modems include slower cable modems that transmit user data at a first rate, and faster cable modems that transmit user data at second rate, greater than the first rate, and where the latency differentiation causes the slower cable modems to transmit user data proportionately more frequently than the faster cable modems.

20. A method performed by a cable modem termination system (CMTS), the method comprising:

grouping, by the CMTS, a plurality of cable modems into a plurality of groups of cable modems, where each of the plurality of groups of cable modems include different ones of the plurality of cable modems;

assigning, by the CMTS, a different virtual upstream channel to each of the plurality of groups of cable modems, where each assigned virtual upstream channel is operating in a different modulation scheme;

generating, by the CMTS, a different bandwidth allocation message for each virtual upstream channel, where the different bandwidth allocation messages decrease overall utilization of a downstream channel associated with the plurality of cable modems; and transmitting, by the CMTS and via corresponding ones of the assigned virtual upstream channels, the different bandwidth allocation messages to corresponding ones of the plurality of groups of cable modems.

* * * * *

UNITED STATES PATENT AND TRADEMARK OFFICE
CERTIFICATE OF CORRECTION

PATENT NO. : 7,903,682 B2  Page 1 of 1
APPLICATION NO. : 12/353077
DATED : March 8, 2011
INVENTOR(S) : Nurettin Burcak Beser It is certified that error appears in the above-identified patent and that said Letters Patent is hereby corrected as shown below:

Column 22, line 29 (Claim 19, line 1), after "18," insert "where".

Signed and Sealed this
Seventeenth Day of May, 2011

David J. Kappos
*Director of the United States Patent and Trademark Office*